United States Patent [19]
Crane et al.

[11] 4,040,010
[45] Aug. 2, 1977

[54] IDENTIFICATION BY HANDWRITING VERIFICATION

[75] Inventors: Hewitt D. Crane, Portola Valley; Daniel E. Wolf; John S. Ostrem, both of Menlo Park, all of Calif.

[73] Assignee: Stanford Research Institute, Menlo Park, Calif.

[21] Appl. No.: 629,290

[22] Filed: Nov. 6, 1975

[51] Int. Cl.² .............................................. G06K 9/00
[52] U.S. Cl. ........................................ 340/146.3 SY
[58] Field of Search ............ 340/146.3 SY, 146.3 SG

[56] References Cited
U.S. PATENT DOCUMENTS

| | | | |
|---|---|---|---|
| 3,333,248 | 7/1967 | Greenberg et al. | 340/146.3 T |
| 3,618,019 | 11/1971 | Nemirovsky et al. | 340/146.3 SY |
| 3,699,517 | 10/1972 | Dyche | 340/146.3 SY |
| 3,818,443 | 6/1974 | Radcliffe, Jr. | 340/146.3 SY |

Primary Examiner—Leo H. Boudreau
Attorney, Agent, or Firm—Lindenberg, Freilich, et al

[57] ABSTRACT

A person, who is to have his identity verified, first writes his signature or any other appropriate group of characters or symbols several times with a special pen which produces signals representative of the writing forces in the plane of the paper and the writing pressure. From these a number of different parameters are derived. These parameters may be, for example, average value, energy, timing, number of zero crossings, etc. Average values and standard deviations are obtained for each of these parameters and these are stored as components of a template vector. In order to detect whether or not a later handwriting sample is authentic, a measure of the difference between the template vector and the later handwriting sample vector is calculated. The distinction between true signatures and forgeries is then made on the basis of this difference. If it is less than an appropriately selected value the signature is judged authentic while if it is above such value it is judged a forgery. The measure of difference may be in terms of RMS difference, for example, or say, average difference. Or, a signature may be deemed a forgery if any one component of the later written signature vector, or some combination of components, deviates beyond some threshold value.

42 Claims, 9 Drawing Figures

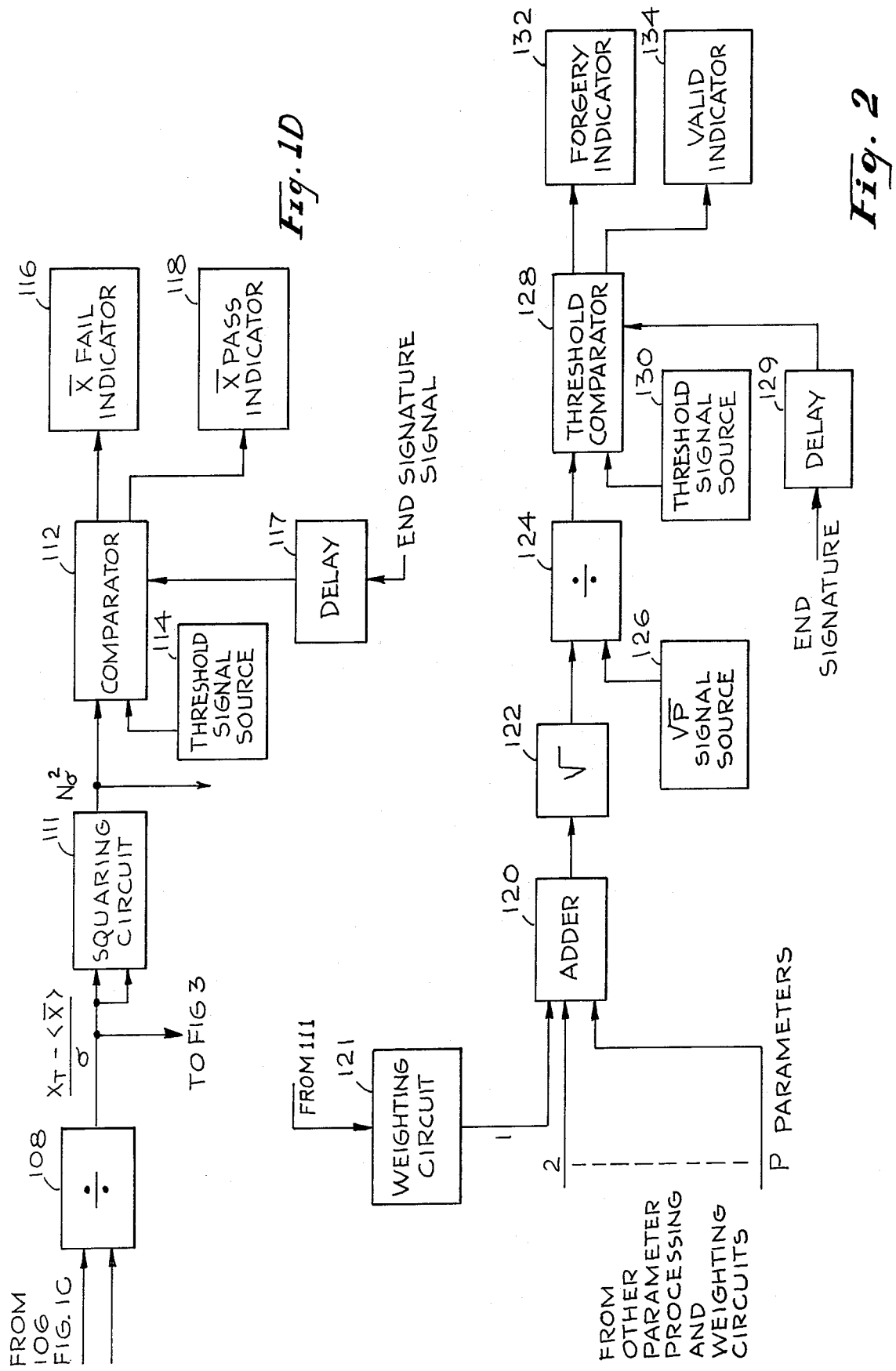

IDENTIFICATION BY HANDWRITING VERIFICATION

BACKGROUND OF THE INVENTION

This invention relates to a handwriting verification system, and more particularly to improvements therein.

OBJECTS AND SUMMARY OF THE INVENTION

An object of this invention is to provide a handwriting verification system which is more accurate than those obtainable heretofore.

Another object of this invention is to provide a handwriting verification system which is novel and useful.

The foregoing and other objects of this invention are achieved in an arrangement wherein a person writes his "signature" which can be his name, or a group of code letters, or words, several times, typically 4 to 8, with a special pen, such as has been described and claimed in an application, Pat. No. 3,915,015 issued Oct. 28, 1975, and assigned to a common assignee. There is derivable from this pen force signals, as a function of time, for three independent directions which can be called pressure, $x$ and $y$. From each of the pressure, $x$ and $y$ signals there may be derived certain parameters such as the average value of the signal, average of the absolute value, RMS energy in the signal, average of the positive or negative values, numbers of positive and negative values, number of zero crossings, and other parameters. In addition there is measured total time, time with the pen-up, time with the pen-down, and the number of pen-ups and pen-downs for the signature. A set of such parameters may be found which characterizes an individual's handwriting. Comparison with parameters derived from a freshly written specimen provides identification.

For signature verification, a template for a particular person is constructed by having that person write, for example, his name several times with the pen, typically 4 to 8, and average values and standard deviations are derived for each of the parameters. These average values and standard deviations are stored as the components of a template vector whose dimension is equal to the number of time dynamic parameters being used. When a sample signature is thereafter written, a measure of different between the template vector and the sample signature vector, with each dimension normalized by the magnitude of the standard deviation of that dimension, is determined. If this difference is greater than a predetermined value, then the sample signature is determined a forgery. If less than the predetermined value, the signature is determined genuine. If the signature is determined genuine, then the template vector may be updated with the information derived from the genuine signature.

The system for performing the foregoing comprises first, means for sampling the force signals from the pen over the interval of the signature, and converting each sample to digital form. Then, for each parameter to be used, the digital samples are appropriately processed to determine the value of the parameter for that sample signature. This number is then stored. The stored values for the identical parameter for each one of the sample signatures, written for a template, are then added and divided by the number, $m$, of signatures taken for the template. This determines the average value of the parameter for the template signature. The stored values are also squared and a sum of these squares is then taken.

The previously determined average value is also squared and multiplied by the number of signatures. This result is subtracted from the sum of squares, then divided by 1 less than the number of signatures. The square root of this quotient gives a statistically unbiased estimate of the standard deviation (sigma) for that parameter.

This value is stored, as is also the value representing the average value of each parameter.

When a sample signature is made, the treatment of the force signals derived from the sample signature, at the outset, is substantially the same as treatment for the force signals derived from each specimen signature. A number of samples $n$ are taken over the interval required to make the signature. Parameters are then calculated. Each calculated parameter value is then subtracted from the stored corresponding template value representing the average value of the parameter and the result is divided by sigma. In one method, the result of this division is squared. This squared quantity is added to the corresponding squared quantity from each parameter. The square root of this sum is the RMS difference between the stored template and the newest test signature. The RMS difference is applied to a threshold value. If the RMS difference exceeds (or is less than) this quantity, the test signature is deemed false (or true). In another method, the absolute value of sigma differences for all parameters are added and divided by $p$, the total number of dimensions, to determine the average sigma variation in each dimension (or parameter). This average difference is applied to a threshold value, as in the RMS method. In still other variations, the number of sigma variations determined for each parameter is applied directly to a threshold. In this method, if any single parameter is at variance by more than a predetermined number of sigma, the signature is deemed a forgery regardless of how close the other parameters are. Also, a signature may be deemed untrue if any two parameters together, have, for example, more than a certain number of sigma variations.

BRIEF DESCRIPTION OF THE DRAWINGS

FIGS. 1A, 1B, 1C and 1D all comprise a block schematic diagram illustrative of the circuitry required for determining whether a signature which has been written, is a forgery or an authentic signature within real time.

FIG. 2 is a schematic diagram exemplifying another method of verifying whether a signature is authentic or a forgery from parameters derived from the signals provided by a signature writing pen.

DESCRIPTION OF THE EMBODIMENT OF THE INVENTION

Figure 1A:
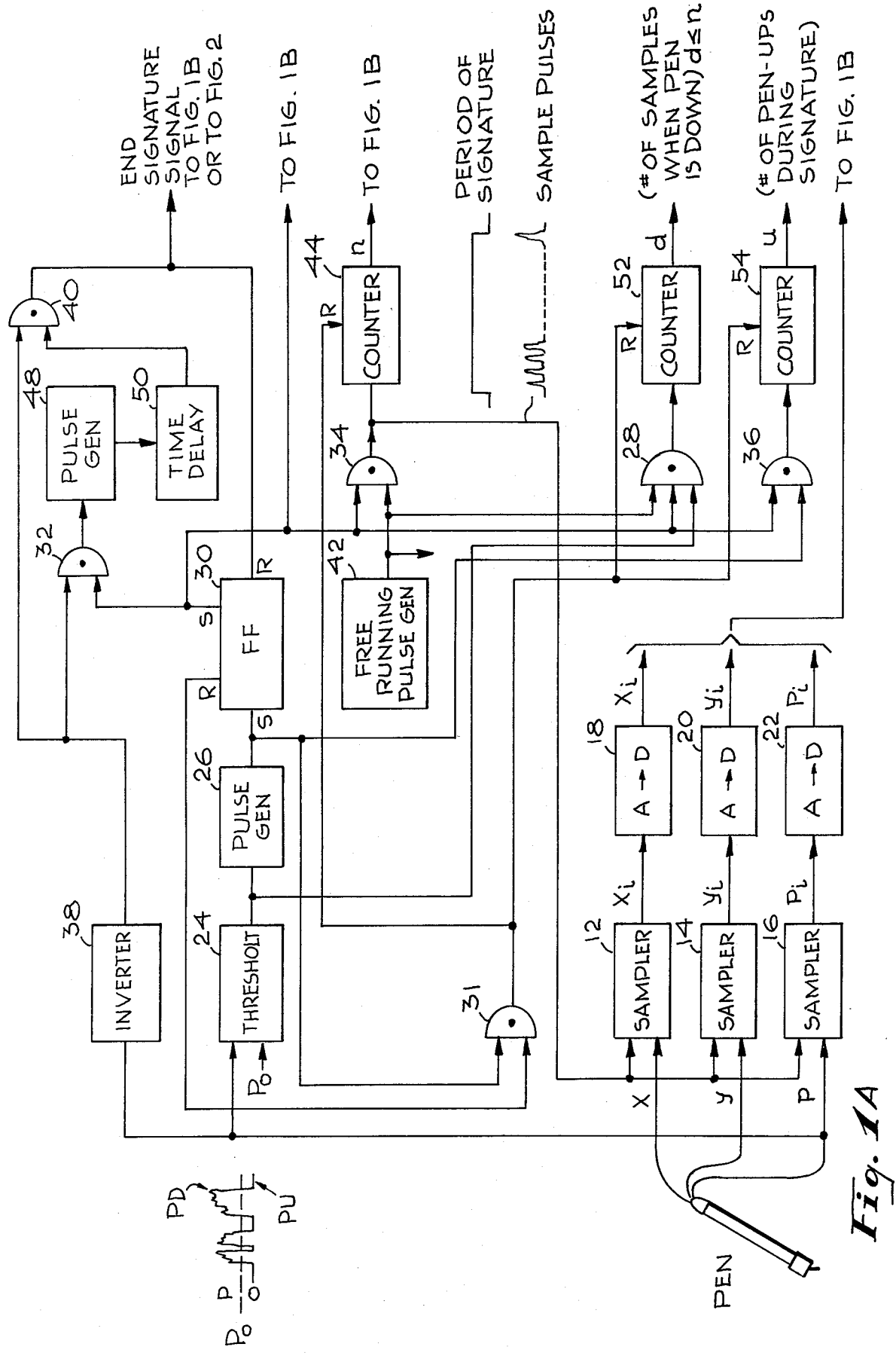

The word signature as used herein shall mean any handwriting which is to be verified and can include a name, a group of code letters, or words, or symbols.

A pen 10, such as the one referred to heretofore, can provide three separate output signals representing the force in each of three dimensions of writing. These signals may be defined as $+x$, writing to the right, $-x$, writing to the left $+y$ writing upward; $-y$, represents writing downward; and $+p$, which is pressure when the pen is down. The value of $x$, $y$ and $p$ represents the magnitude of force in the given direction.

A pen 10 applies these signals over the lines represented as $x$, $y$ and $p$ to sampling circuits respectively 12, 14 and 16. The signals coming out of the sampling circuits, respectively designated as $x_i$, $y_i$ and $p_i$, are analogue signals that are then applied to the respective A to D convertors 18, 20, 22, that respectively convert them to digital $x_i$, $y_i$ and $p_i$ signals.

A pressure signal p, which exceeds a predetermined threshold, indicative of the fact that the pen is down on paper with sufficient pressure to write, enables a threshold circuit 24 to enable a pulse generator 26 as well as an And gate 28.

The pulse generator output sets a flip flop 30. The set output of the flip flop 30 is applied to an And gate 32, And gate 34, And gate 28, and also to an And gate 36. The pen-down signal p is also applied to an inverter 38, whose output is applied to both the And gate 32 and to an And gate 40.

A free running pulse generator 42, applies its output to And gates 34, and 28. And gate 34 is enabled to pass the pulses from the free running pulse generator 42 when it receives the set output of flip flop 30. These pulses are applied to a counter 44, which counts the number of pulses $n$ enabled to be passed through the And gate 34 during the entire signature period. Pulses from the And gate 34 are also applied to sampling circuits 12, 14 and 16. The sampling circuits take a sample of their inputs each time they receive an output pulse from the free-running pulse generator 42.

Should the pen be lifted longer than a pre-determined time, means are provided for resetting the flip flop 30 whereby And gates 34, 28 and 36 will be inactivated. Should the pen be lifted from the paper for an interval shorter than the predetermined interval, for example, to cross t's or dot i's or for some other purpose, then the flip flop 30 will not be reset.

The apparatus for taking care of this situation, at the outset, comprises the And gate 32 which is enabled in the presence of an output from inverter 388, when there is no pressure signal, p, representing a pen-down signal applied to its input. When a pen-down signal is applied to the input of the inverter, then its output will not pass through the And gate 32 even though the other input to the And gate, namely the set output of the flip flop 30 is present.

Accordingly, should the pen be lifted from the paper, the inverter 38 output is present and can pass through And gate 32 and can enable And gate 40. The output of And gate 32 enables a pulse generator 48 to apply a pulse to the time delay circuit 50. At the end of a predetermined interval established by the time delay circuit 50, an output is applied thereby to the And gate 40, which can pass through, if the gate is still enabled as a result of the pen being lifted from the paper. However, if the pen has been pressed against the paper for writing within the interval of the time delay 50, And gate 40 is disenabled.

On the assumption that the And gate 40 is enabled to pass the output of the time delay 50, it serves to reset the flip flop 30. The reset output of flip flop 30 is applied to an And gate 31 to enable it. Upon the occurrence of the next pressure signal indicative of the commencement of writing a new signature the output of And gate 31 resets counters 44, 52 and 54. And gate 31 is disabled by flip flop 30 during the entire period of any given signature, thereby preventing the counters from being reset by pen-up signals that may occur during a signature.

Any gate 28 has three inputs which all must be simultaneously present in order to produce an output. These comprise the output of the free-running pulse generator, the set output of flip flop 30 as well as the output of threshold circuit 24, which occurs over the interval while the pen is down. The output of And gate 28 is applied to a counter 52, and it counts the number of pulses provided by the free-running pulse generator over the interval while the pen is down during the entire signature; during those intervals that the pen is lifted, And gate 28 can no longer pass pulses from the free-running pulse generator. This counter output is represented by $d$. Counter 52 is reset by the output of And gate 31.

And gate 36 is enabled in the presence of a set output from flip flop 30, to pass the pulses provided by pulse generator 26 to a counter 54. Each time the pen is lifted and then brought down, during the interval of writing a signature, which lift does not occupy more than the time established by the time delay 50, pulse generator 26 provides an output. The outputs of pulse generator 26 are counted by the counter 54, and the output of the counter is represented by $u$. The count in counter 54 is a count of the number of "pen-ups" during the course of a signature. Counter 54 is reset in response to the output of And gate 31 which occurs when the next signature is commenced.

Figure 1B:
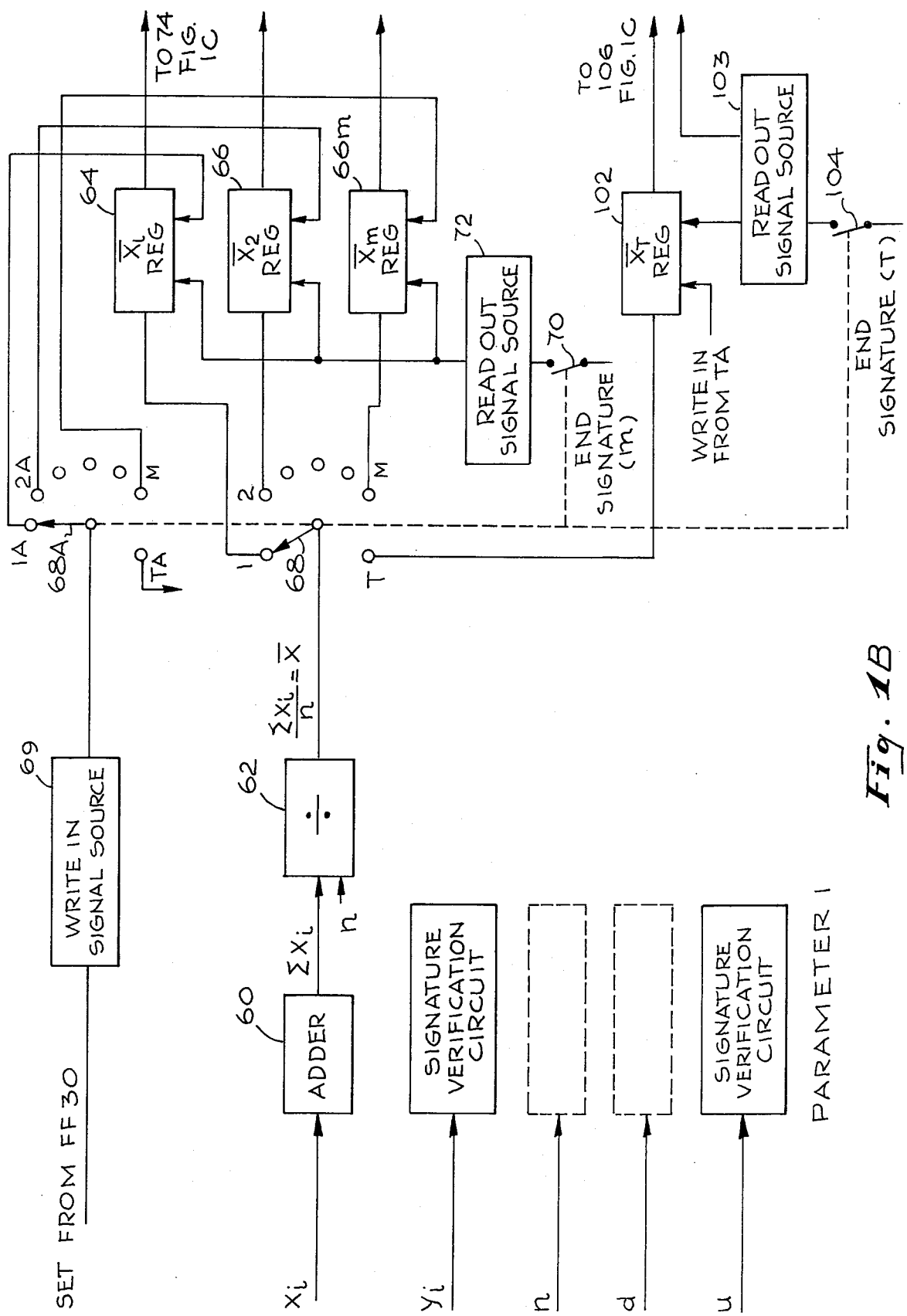
Figure 1C:
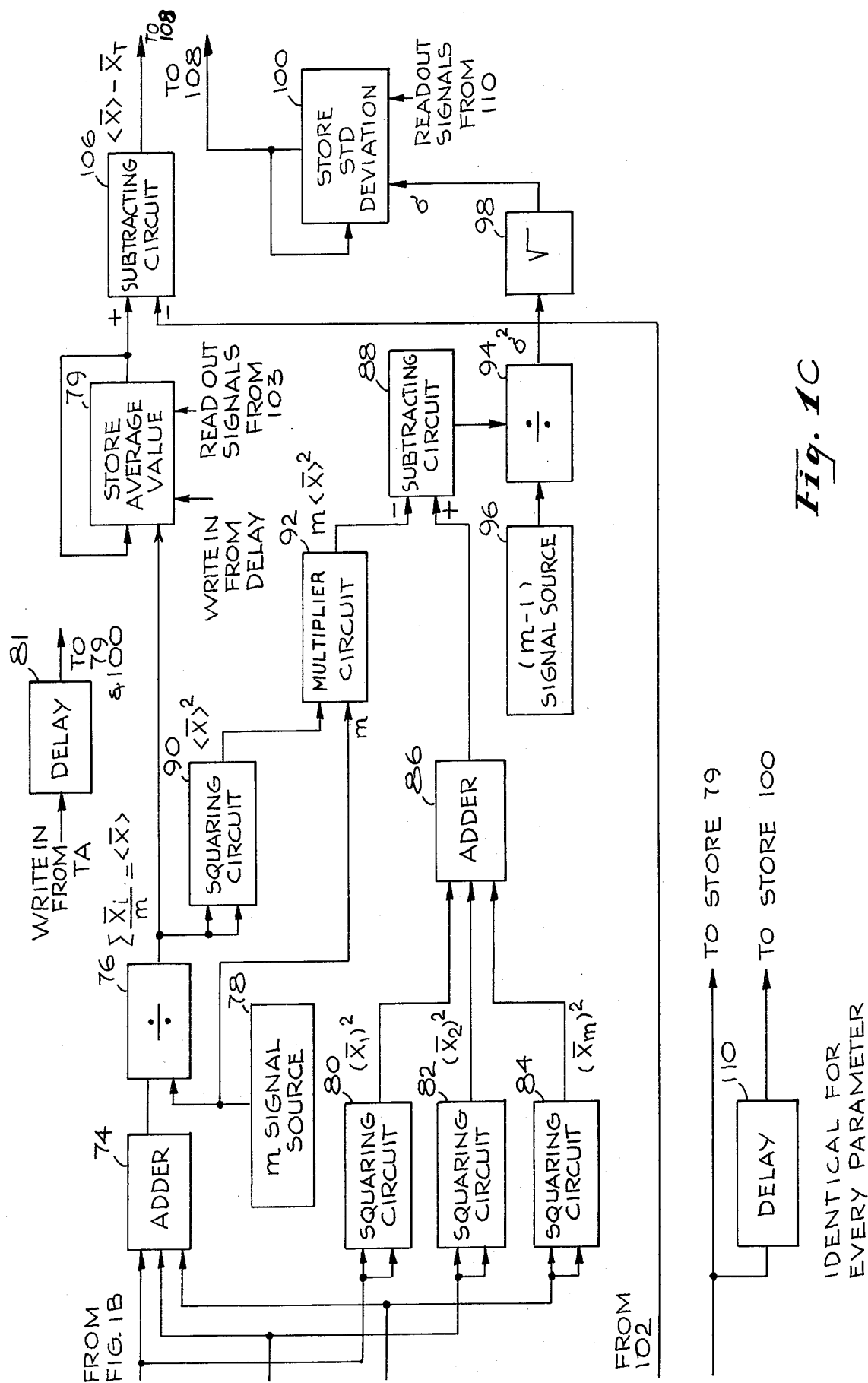

Referring now to FIGS. 1B and 1C, there is shown a schematic diagram of how one parameter, for example, $\bar{x}$, is processed first for establishing a template value for this parameter from a plurality of signatures, and then for processing this parameter when derived from a sample signature. It should be noted that one of the circuit arrangements shown in FIGS. 1B and 1C is required for each parameter to be processed.

The digital $x_i$ signals which are the output of the A to D convertor 18, are successively applied to an adder circuit 60, and its output, which is the sum of all the sample $x_i$ signals, is applied to a divider circuit 62. The divisor input to the circuit 62 is the $n$ output of counter 44 representing the total number of samples taken over the interval of the writing of the sample signature. The output of the divider 62 is thus the average value of the parameter x is designated as $\bar{x}$.

All $\bar{x}$ signals generated for each of the signatures being provided for making a template are respectively stored in registers 64, 66, 66m. Before each signature for the template is written, a selector switch 68 is operated to direct the $\bar{x}$ output for that particular signature to the one of the registers 64, 66, 66m into which it is to be stored. At the end of the template parameter generating procedure, switch 68 is connected to the terminal designated as T indicative of the connection which should be made for comparing a test signature with the template.

A write in signal source 69 is energized upon each occurrence of the output of And gate 40. Its output is applied to a selector switch 68A which is ganged to operate with selector switch 68. The output terminals 1A, 2A — MA and TA apply a required number of write in pulses to registers 64, 66, 66m and 102. These write in pulses are directed to the registers along with the outputs of divider 62.

When the selector switch 68 is turned to make a connection with the $m$ or last terminal for directing the $\bar{x}_m$ value into the the register 66m, it closes a switch 70, whereby a read-out signal source 72, is actuated by the output of delay 71 which is actuated in response to the end-signature signal output of the And gate 40, to produce signals for shifting out the contents of registers 64, 66 66m after the $\bar{x}m$ value has been entered into register 66m. The $\bar{x}_1$, $\bar{x}_2$, and $\bar{x}_m$ signals are applied to an adder 74, to be added, then applied to a divider 76, whose divisor input is the value $m$, derived from the $m$ signal source 78, which is a signal representative of the number of signatures which have been taken for the template. Thus the output of the divider 76 is an average value $<\bar{x}>$ for the parameter $\bar{x}$ derived from all of the template signatures. This value is entered into an "average value" storage register 79, where it is stored. Write in signals to register 79 are derived from a delay circuit 81. Input to delay circuit 81 is derived from terminal MA. The delay is long enough to permit the $<\bar{x}>$ signal to be derived.

The outputs from the register 64, 66 and 66m, are also applied to squaring circuits respectively 80, 82 and 84, whose respective outputs are added by an adder circuits 86. The output of the adder circuit 86 constitutes the sum of the squares of the sample values of parameter $\bar{x}$. This sum is applied as an input to the adder circuit 88. The output of the divider circuit 76, constituting the average value, $<\bar{x}>$, is squared by a squaring circuit 90, and it is then multiplied in a multiplier circuit 92 by the value $m$ derived from the $m$ signal source 78. The output $m<\bar{x}>^2$ is subtracted from the sum of the squares of the $\bar{x}$ values for all of the template signatures and the difference output is applied to a divider circuit 94. The divisor input to the divider circuit 94 comprises an input from a reference source 96, designated as $(m-1)$ signal source. (The number of template signatures minus one). The output of the divider circuit 94 is designated as (sigma)$^2$, or the value of the standard deviation squared. To obtain sigma, the output of the circuit 94 is applied to a square root circuit 98. The output of the square root circuit, sigma, is applied to a sigma storage register 100. Write in signals to storage register 100 are derived from the output of delay circuit 81.

There is now stored in the storage register 79 the average value of the parameter, $<\bar{x}>$, for all of the signatures used in the template process. This is now stored in the storage register 100, the value of the standard deviation, sigma, for this particular parameter.

The selector switch 68 is now connected to the terminal designated T, whereby when a specimen signature is written, the value of the parameter $\bar{x}$ for the specimen signature, which may herreafter be represented as $\bar{x}_T$, is entered into a register 102. When the selector switch 68 is connected to the terminal T, it opens switch 70 and closes a switch 104, whereby the occurrence of the end signature signal, from And gate 40, can enable a readout signal source 103 to provide signals for causing the shift register 102 to shift out its contents to a subtractor circuit 106. Simultaneously, therewith, readout signals are applied to the storage register 79, causing it to read out its contents and apply them to the subtractor circuit 106. The contents of the storage register 79 are also, simultaneously with readout, circulated back into its input so that they are available for future use.

The circuit 106 subtracts the value of $\bar{x}_T$ from the average template value $<\bar{x}>$ and applies the difference as one input to the divider circuit 108. The divisor signal applied to the divider circuit 108 comprises the sigma output received from the storage register 100.

Readout signals from the readout signal source 103, which is actuated by the end signature signal, are applied to a delay circuit 110. The output from the delay circuit 110, causes the shift register 100 to shift out its contents and apply them to the divider circuit 108 at the same time signals are being received from circuit 106 and also to recirculate these contents and enter them back into the storage register so that the value sigma is available for future use.

The output from the divider circuit 108 is squared by a squaring circuit 111, whose output is then applied to a comparator circuit 112. Another input to the comparator circuit 112 is a signal representative of an acceptable threshold which is derived from a threshold signal circuit 114. The comparator is enabled by an end signature signal which has been delayed by a delay circuit 117. If the comparator senses that the signal received from the squaring circuit 111 exceeds the threshold value, it actuates the indicator 116, called an $\bar{x}$ fail indicator. If the output of the squaring circuit 111 is less than the threshold potential, it actuates an indicator designated as an $\bar{x}$ pass indicator 118.

The circuits just described for the $\bar{x}$ parameter are repeated for the $y$, $p$ and any other parameters derived therefrom. A signature may be decided as a forgery on the basis of any one of these parameters being out of tolerance, as indicated for instance, by the $\bar{x}$ fail indicator being actuated. Or, a signature may be decided as a forgery on the basis of any two of the parameters being out of tolerance by a certain amount.

Another approach to determining whether a signature is valid or forged, from the parameters which have been derived, is shown in FIG. 2. The output of each squaring circuit 111, for each parameter, which is the square of the difference between the average parameter value and the template average parameter value divided by the standard deviation, is applied to an adder circuit 120. However, where it is desired to give more weight to one or more parameters than the others, the output of squaring circuit 111 may first be applied to a weighting circuit 121. This circuit may be an analog circuit such as a potentiometer and/or gain controlled amplifier, if the parameter signals are analog, or a multiplier or divider circuit if the parameter signals are digital. One can give more weight to one parameter, for example the parameter $\bar{x}$, by increasing by a predetermined amount the signal received from squaring circuit 111 relative to the other parameter signals, or by reducing the amplitude of all parameter signals except the signals of the parameter or parameters desired to be emphasized. The determination of proper parameter weighting may be made from a statistical study that shows which parameters are most effective for separating true from false signatures.

All of the weighted and unweighted parameters are added in an adder circuit 120. The output of this circuit is applied to a square root circuit 122. The output of the square root circuit is applied to a divider circuit 124, whose divisor input is a signal from a $\sqrt{P}$ signal source 126, representative of the number of parameters that have been added. The output of the divider circuit is the root mean square difference between the template and test signature vectors. This RMS value is applied to a comparator circuit 128. A delay circuit 129 applies a delayed end of signature signal to the comparator which enables it to compare the RMS value with a threshold potential signal from a source 130.

If the RMS value exceeds the threshold signal the comparator actuates a "forgery" indicator 132, and if the RMS value is less than the threshold signal, it will actuate a "valid" indicator 134. The separate indicators for each parameter shown in FIG. 1C may be maintained with the one shown in FIG. 2 and used in combination. For instance, though the RMS authentic indicator 134 is actuated, if any one of the other parameters are more than a predetermined sigma out of line then the test signature may still be considered a forgery. This may be accomplished by inhibiting the valid indicator 134 if any of the fail indicators 116 are energized.

FIG. 1A shows other parameters such as $d$ and $u$ being derived. The pen 10 can still provide more parameters, than the ones indicated thus far. For example, the pen 10, as is described and shown, for example in the application U.S. Pat. No. 3,915,015, issued Oct. 28, 1975, previously referred to, produces $+x$, $-x$, $+y$, and $-y$ signals. $+x$ and $-x$ signals are respectively generated when the pen is moved in opposite horizontal directions, and $+y$ and $-y$ are respectively generated when the pen is moved in opposite vertical directions. Accordingly, $+x$, $-x$, $+y$ and $-y$ signals may be separately sampled, digitized and otherwise treated in the manner already described. Thus far, by way of example, a total of 45 parameters for each signature have been evaluated. Examples of other parameters are, percent of time positive, percent of time negative for each signal. These may be derived from $+x$, $+y$, $-x$ and $-y$ signals by measuring the interval over which each of these various signals is of one polarity or the other. Number of crossings may be derived by using a zero crossing detector.

Figure 3:
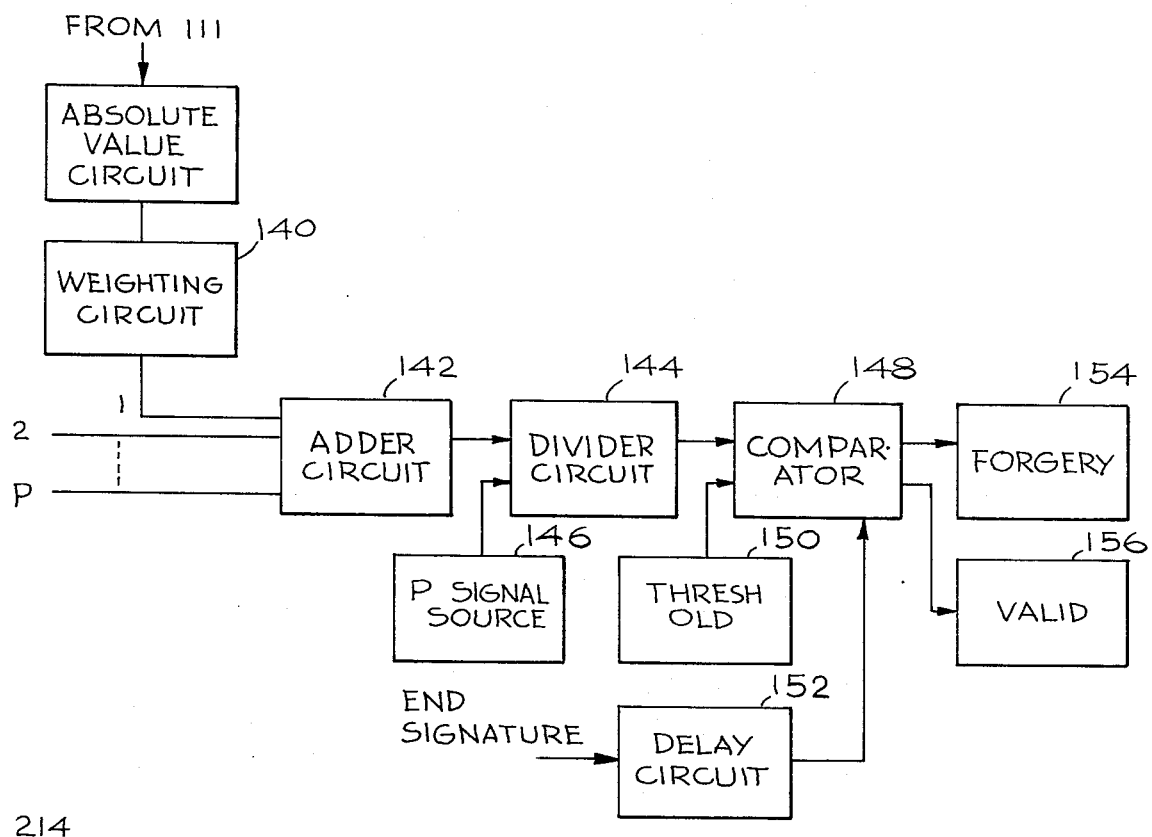
FIG. 3 is a schematic diagram showing still another method of signature verification.

FIG. 3 is a schematic diagram of still another method of determining whether a signature is valid or a forgery. Instead of squaring the output of divider 108, which is the normalized difference between $<\bar{x}>$ and $\bar{x}_T$, which respectively constitute an average value of $\bar{x}$ for all specimen signatures and this parameter derived from the specimen signature, the absolute value of this output is developed by absolute value circuit 139 and applied through suitable weighting circuits 140 to an adder circuit 142. The absolute value circuit is a circuit which disregards the sign of the output of divider 108 and passes through the balance. The adder circuit output which is the sum of the normalized difference is then applied to a divider circuit 144 to be divided by the number of signature parameters, P, being considered. The value of P is provided by a P signal source 146. The divider output is compared by comparator 148 with a threshold, provided by a threshold signal source 150. The comparator is enabled by an end signature signal which is delayed by a delay circuit 152. The comparator output, if the divider circuit is greater than the threshold enables the forgery indicator 154 and if less, the valid indicator 156.

The foregoing description exemplifies three different methods of combining parameters derived from sample signatures and comparing the results of such combinations with similar parameters derived from a specimen signature or from specimen signatures for evaluation. However those skilled in the art after having the benefit of this disclosure, will realize that these are not the only ways for combining and comparing and therefore these should be considered as exemplary and not limiting. For example, instead of adding the corresponding parameters from each sample signature and dividing by the number of parameters being added, to provide an average, the $n$th root of the product of $n$ corresponding parameters may be used or a geometric average can be used. Instead of standard deviation, another useful measure of variance can be derived for each parameter by determining the absolute difference of corresponding sample values for each parameter from their average, adding these absolute differences and dividing this sum by the number of samples. These are all considered to be within the spirit and scope of this invention.

Figure 4:
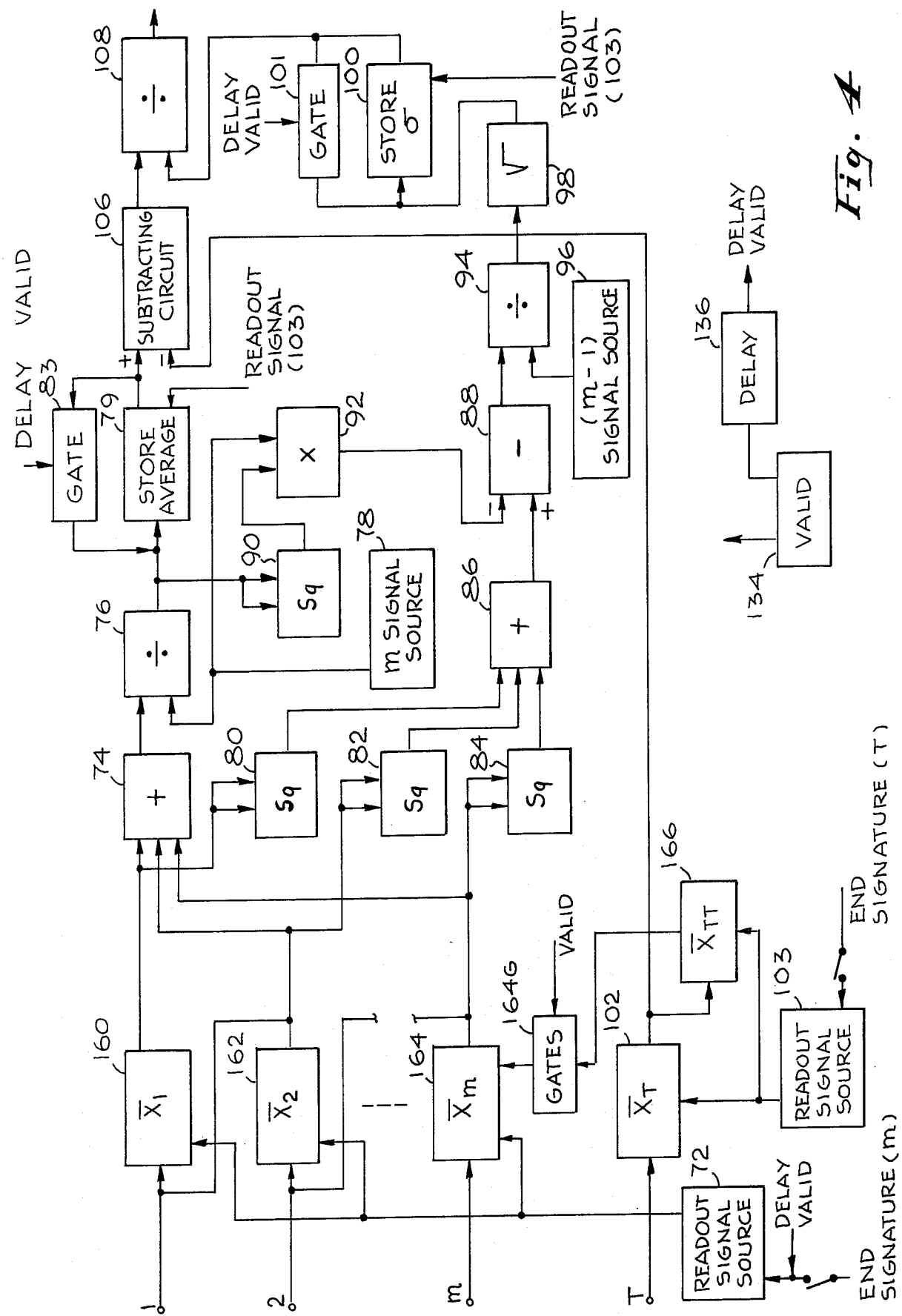
FIG. 4 illustrates schematically how a template vector may be updated from the latest accepted sample signature.

FIG. 4 is a schematic drawing exemplifying how a signature template can be updated with the latest valid signature. Circuit components may be added to the circuit, shown in FIGS. 1B and 1C, to perform this function. These circuit components already shown and described in FIGS. 1B and 1C will bear the same reference numerals. Only so much of FIGS. 1B and 1C is shown as is required to provide an understanding of the updating function. It should be emphasized again that the FIG. 4 circuit must be repeated for each parameter derived and used in a template.

Registers $\bar{x}_1$, $\bar{x}_2$, $\bar{x}_m$, respectively 160, 162 and 164 perform in the same manner as registers 64, 66, and 66$m$ in FIG. 1B. In addition registers 162 and 164 have their outputs connected to the preceding register input, (i.e. register 162 output to register 160 input, register 164 output to register L-1 input, where register 164 is the L register), so that when shifted in response to signals from readout signal source 72, the contents of register 162 is transferred into register 160 and the contents of register 164 is transferred to register L-1.

Register 102 ($\bar{x}_T$) performs the same functions as described previously. However, when it shifts out its contents in response to the read out signals from source 103, its $\bar{x}_T$ outputs is entered into a shift register 166 ($\bar{x}_{TT}$). The shift register 166 can thereafter transfer its contents through gates 164G into shift register $\bar{x}_m$ when the gates are enabled by a valid signal.

Accordingly, upon the occurrence of a valid signature, the latest $\bar{x}$ information (from register $\bar{x}_{TT}$) is entered into register $x_m$. The imformation derived from the oldest signature in register 160 was previously discarded.

After the transfer of data from register $\bar{x}_{TT}$ has occurred, a "delay valid" signal occurs. This is derived from a delay circuit 136. The input to the delay circuit is a valid signal. The delay valid signal is used to energize the read out signal source 72 whereby registers 160 through 164 are enabled to transfer out their contents and also to transfer them into a preceding register in the hierarchy so that they are maintained in the registers for use in the next updating operation.

The circuits between the registers 160 through 164 and the average storage register 79 and the sigma storage register 100 are the same as was described in FIGS. 1B and 1C and they process the contents of the storage register in the manner previously described to store an updated average value $<\bar{x}>$ in the register 79 and an updated sigma in the register 100. However, registers 79 and 100 now have normally closed gates respectively 83 and 101, in their feedback loops whereby they can act as circulating registers for retaining their contents during the comparison process, but when their contents are being updated the normally closed gates 83 and 101 are opened by a delay valid signals from delay 136 whereby the recirculation of their contents is prevented.

Other ways of updating the signature template with the latest valid signature information will be apparent to those skilled in the art who have had the benefit of this disclosure, and should be considered within the spirit and scope of this invention. For example, an exponential method of updating may be used. In this method, $\frac{1}{8}$ of the parameter derived from a valid specimen signature (i.e. $\frac{1}{8} \bar{x}_T$), is added to $\frac{7}{8}$ of the average value for that parameter, (i.e. $\frac{7}{8} <\bar{x}>$), and the sum is used as the new average value for future signature evaluation.

The standard deviation, $\delta$, may be updated as follows:

$$\delta_i \sqrt{\frac{6\delta_{i-1}^2 + 7(\bar{x}_{i-1})^2 + x_i^2 - (7x_{i-1} + x_i)^2/8}{7}}$$

$\bar{x}_i = (7\bar{x} + x)/8$ (Exponental Update of the Mean)

Where
$\delta i$ = Standard deviation after $i$ signatures
$x_i$ = Parameter value for signature $i$
$\bar{x}_i$ = Mean after $i$ signatures
$\delta_{i-1}$ = Standard deviation after $i-1$ signatures
$\bar{x}_{i-1}$ = Mean after $i-1$ signatures From what has been described, those skilled in the art will known how to implement the foregoing, either as hardwired circuits or as a computer program for updating $\delta$ and the average value of a parameter from a valid signature.

One way of using the system described herein is to provide a hardwired system as described above which is placed at every location where signature verification is to take place. A different average store and sigma store register has to be provided for storing the data required for verification of different specimen signatures. The registers required by a user of the system may be selected by the user actuating keys, or using a card which contains a code which, upon being read selects the registers to be used. Preferably however the storage functions required are provided by a computer memory which is addressed either by actuated keys or by the code read from a card. The computer memory output is entered into registers.

Figure 5:
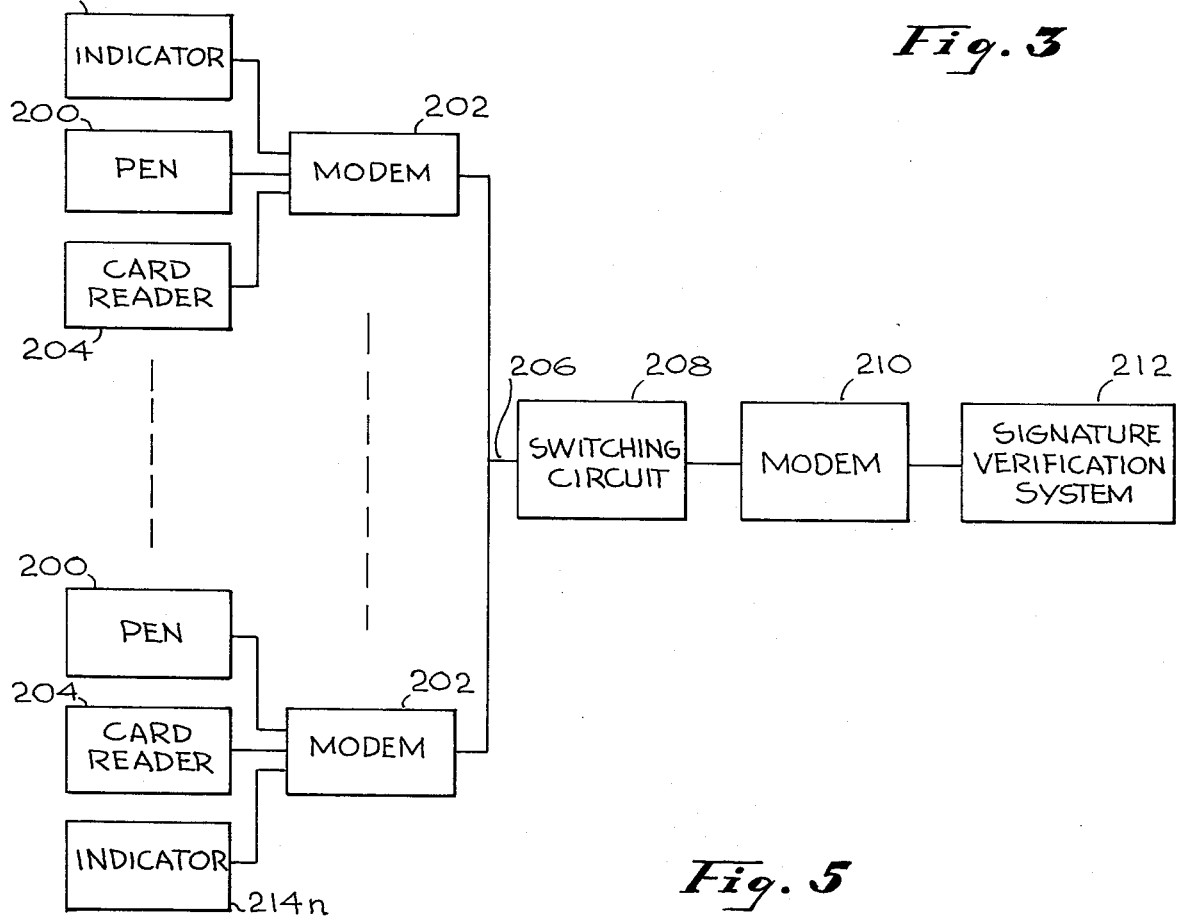
FIG. 5 schematically represents several locations being serviced for signature verification by a central computer.

An alternative arrangement for the system described is to place a signature pen 10 address generating structure and indicator at each location and have the rest of the system placed at a central location to which the various pens may be connected by well known means, such as a telephone line. This is schematically represented in FIG. 5 where at each location, a pen, 200, . . . 200n, such as shown in FIG. 1A is connected to a modem, 202, . . . 202n, together with signals from a card reader, 204, . . . 204n. The modem modulates these signals on a carrier and sends them over a line 206 to a central location. There a switching circuit 208 successively selects signals from each one of the locations and applies them to another modem 210, which demodulates them and applies them to a signature verification system, 212, which processes a specimen signature, in the manner described and sends back a "true" or "false" signal to an indicator, 214, . . . 214n at the location which has been sending signals.

An arrangement, using communication equipment of the type described, which communicates with a central computer, is well known, being used for example, for ticket reservations.

While the writing verification system described thus far is a special purpose or hard wired computer, those skilled in the art will readily understand how a general purpose computer may be programmed to provide the sequence of computational steps described. All the required storage is provided by the memory and registers of the computer. The template signature information for a large number of individuals is stored by the computer memory and is called out for use in determining the validity of a signature by having the signer either punch a keyboard with a code number which provides the required memory address for that person's template data, or by using a key card, or any other of the well known techniques whereby a computer memory may be addressed from an external location. Alternatively, a signature identification may be achieved by comparing all of the stored template information with the information derived from a specimen signature to see which of the stored templates it comes closest to and then identifying that signature.

Figure 6:
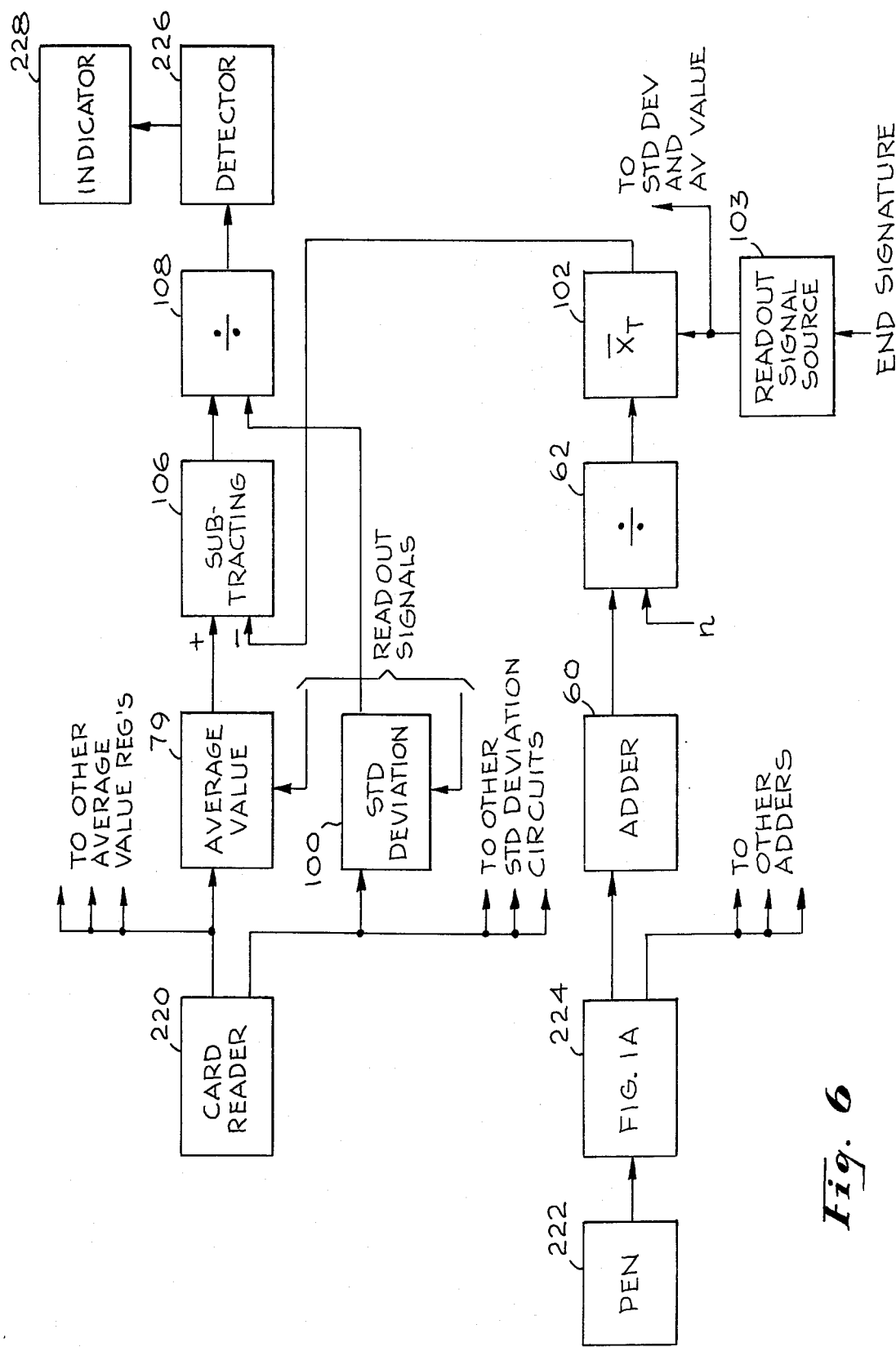
FIG. 6 is a schematic representation of another embodiment.

Another embodiment of this invention is one shown in FIG. 6, wherein an individual is given a card, be it credit card or identification card on which is magnetically encoded or embossed, numbers representing the average values of different parameters of sample signatures, which would otherwise be stored in the average store 79, and also the values of sigma for each of these parameters. In FIG. 8, only one card reader 220, one pen and one FIG. 1A circuitry 224, is required at a location. As many duplicates of the remaining circuitry are required as there are parameters being derived by the FIG. 1A circuitry. In order to direct the several average values and standard deviations into the proper registers separate reading heads may be used for reading each number and the output of each reading head is then directed to one of the registers. Alternatively one reading head with sequential read out may be used. Techniques for doing this are well known.

The remainder of the circuitry shown in FIG. 6 is the same as the circuitry shown in FIGS. 1B and 1C, or FIG. 2, except that the circuits required for calculating the average values, $<\bar{x}>$, $<\bar{y}>$, . . . , and standard deviations for each of these parameters is omitted, since this function is performed at a central location where a person desiring a card goes and signs several sample signatures. These are processed in the manner described to provide the average parameter values for the sample signatures and their associated standard deviations.

A card is placed into the reader 222 and the average values and standard deviations are entered into the appropriate registers, 79 and 100. The person who is to be identified by his handwriting then proceeds to provide a specimen signature with pen 222. The FIG. 1A circuitry generates the various sample parameter signals $x_i, y_i, \ldots$, from the pen output, and these are added by adder 60, then divided by the number of samples $n$, by dividers 62. The $\bar{x}_T, \bar{y}_T \ldots$ outputs of dividers 62 are entered into register 102. When the signature is finished read out signal source 103 causes the registers 102 and 79 to shift out their contents into subtractor 106. The outputs are divided by standard deviations. The output of dividers 108 are applied to the remainder of the system, here called detector 226, and indicator 228, used for determining whether the specimen signature is valid or not valid, in accordance with the previously described information.

Of course, if desired, the same communication system may be used as was described for FIG. 5, where only a pen, card reader and indicator are placed at each location with the remainder of the verification equipment being centrally located.

There has accordingly been described and shown herein a novel and useful arrangement for determining in real time whether a signature is valid or a forgery.

APPENDIX

There follows a flow diagram illustrative of the procedure followed by a general purpose computer, in response to a program of which a computer print out also is appended hereto. The flow diagram illustrates the sequence between numbers 1000 and 5000 in the program. The program provides signature verification in the manner previously described. If effectively is a software counter part of the hardware described herein. Accordingly, it is intended that the spirit and scope of the claims herein cover a signature verification system both in its hardware and as a programmed general purpose computer. A general purpose computer operating under the control of the appended program performed signature verification in the manner described herein.

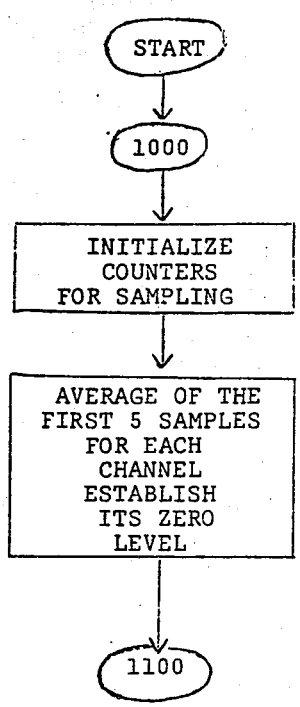

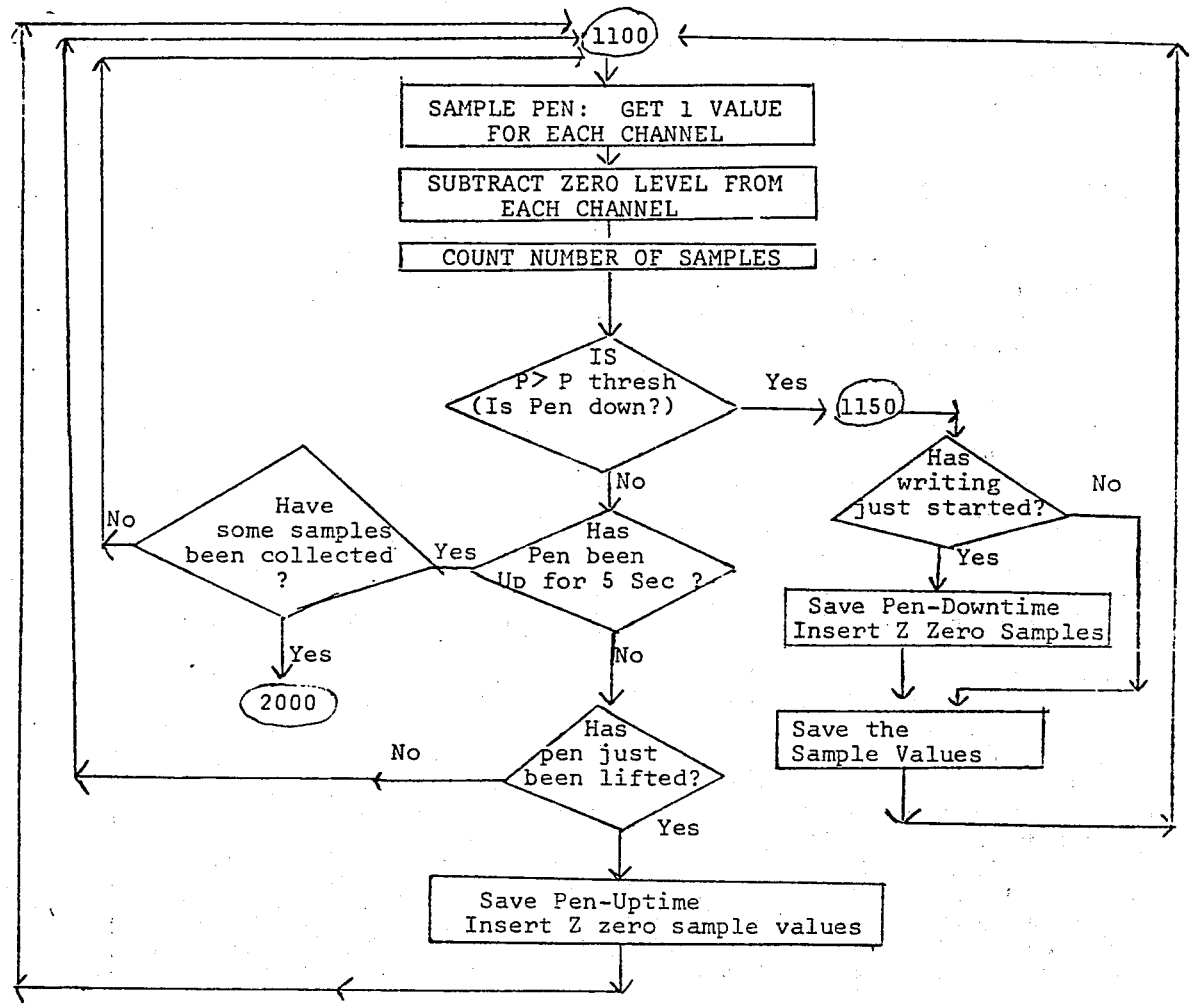

LOOP TO GATHER SAMPLES

PEN SAMPLING COMPLETE - COMPUTE PARAMETERS
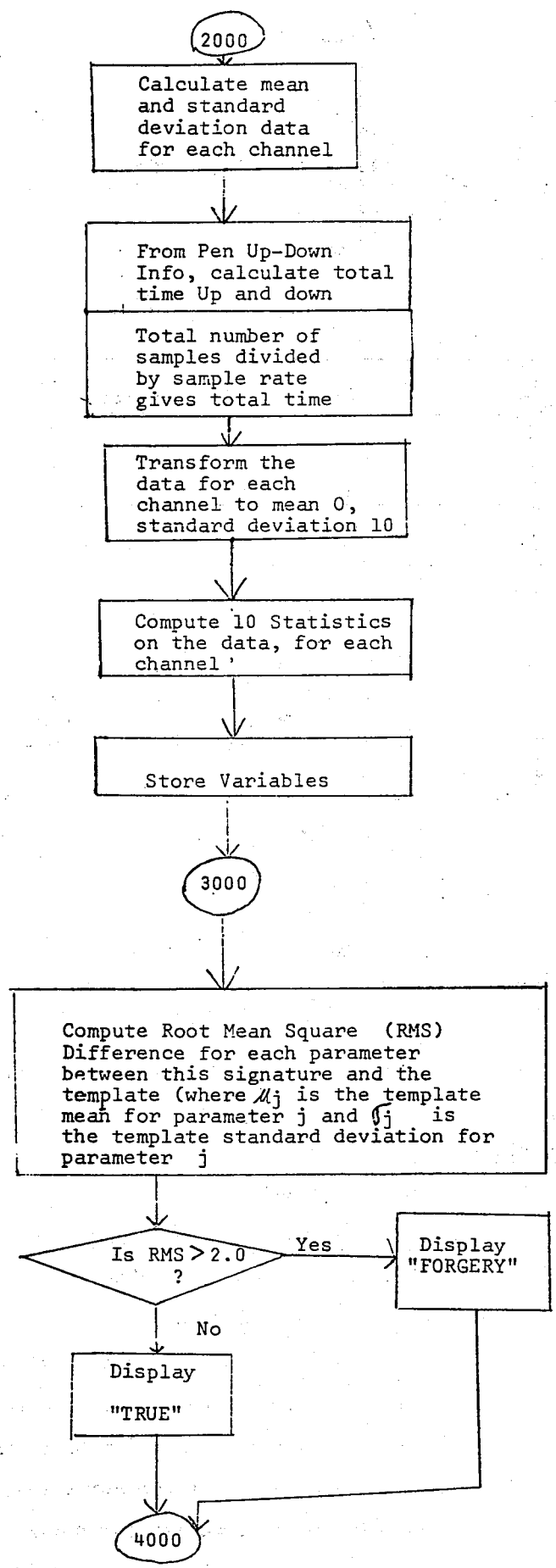

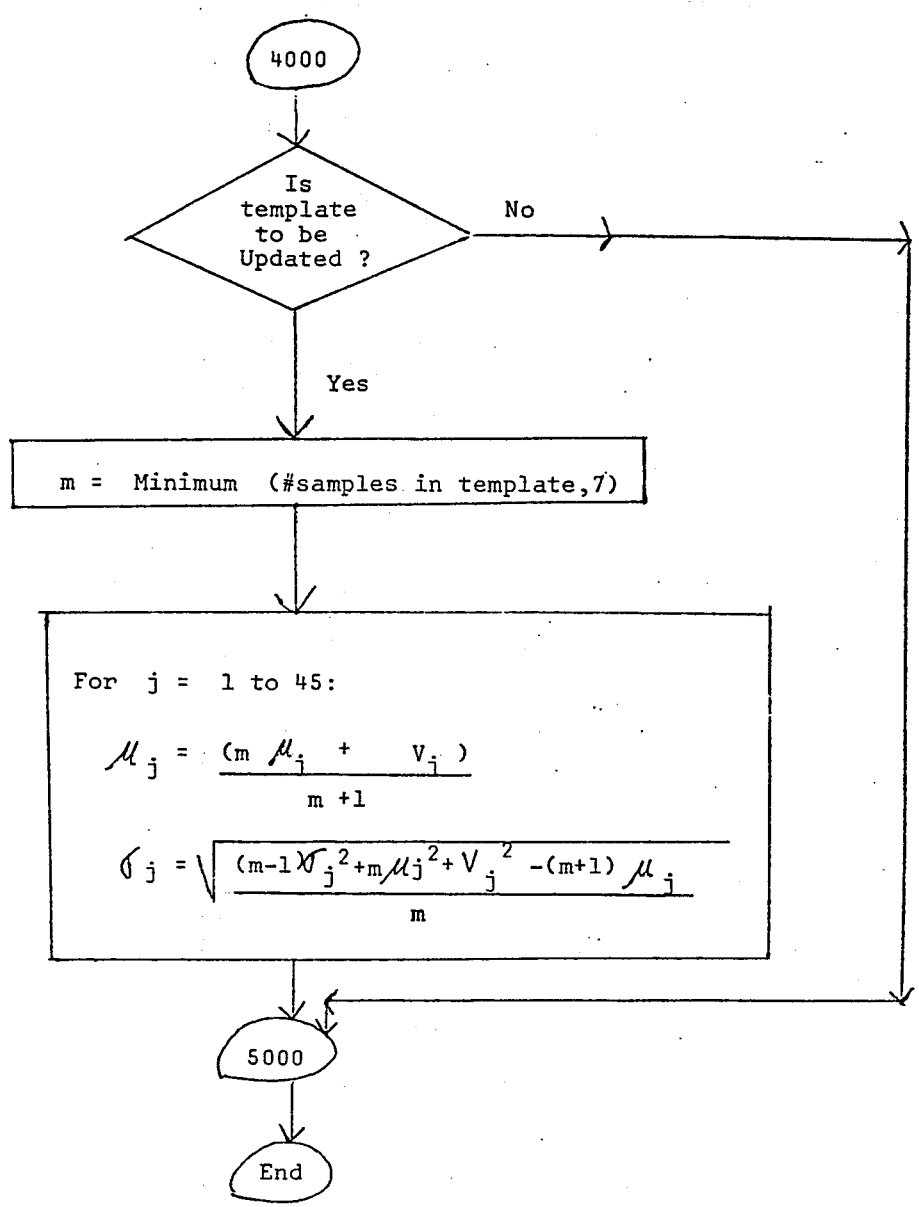

COMPUTE STATISTICS FOR EACH CHANNEL (Subroutine STATS)

Statistic

1    Average of pre-normalized data

2    Standard deviation of pre-normalized data

3    Maximum normalized data value

4    Minimum normalized data value

5    Average absolute normalized data value

6    Average positive value for normalized data

7    Number of positive values for normalized data

8    Average negative value for normalized data

9    Number of negative values for normalized data

10   Number of zero crossings in normalized data

```
C    SIGVER.FTN
C      Copyright 1975  Stanford Research Institute
C
C    Program SIGnature VERIfy
C      This program is for a signature verification
C      program. It samples the pen, accumulating statistics in real
C      time. After the signature, it compares these statistics with
C      an existing template for the signature. A provision is made
C      for updating the template.
C
C      The following character commands give the operator some control
C      of the program:
C      Label Character -- description                                      default
C       210    a   identification (initials) of the author (person writing)
C       230    c   Measure cutoff                                           2.0
C       240    d   "down" threshold (pressure > d implies pendown)          50.0
C       260    f   sampling frequency (120,60,40,30,24,20)                  60
C       320    l   'LATER' switch -- compute statistics while               'true'
C                    sampling pen or delay until after
C       330    m   Verifying measure -- A=AbsDif, R=RMS Dif                 RMS dif
C       340    n   Normalize data by template standard deviation            no
C       360    p   Switch input device code from pen to platen              pen
C       380    r   sampling rate (120,60,40,30,24,20)                       60
C       390    s   identification (initials) of the signature
C       400    t   Time lag to decide signature is finished (seconds)       2.0
C       420    v   Verifying measure -- A=AbsDif, C=Correl, R=RMS Dif       RMS dif
C       430    w   weights                                                  1.0
C       460    z   Zero the template
C       510    A   Calculate average writing angle                          'false'
C       540    D   debugging printout                                       0
C       630    M   exit to MAE
C       640    N   Change sign of pressure to negative                      'false'
C       660    P   specify amount of printout                               99
C       680    S   Return to program SIG11
C       900  space -- start sampling the pen
C
C      Assume platen or pen output channels are connected to channels 1-3.
C
C    Version 2, January 15, 1975 -- 'later' switch added
C    Version 3, March 12, 1975 -- added calculation of writing angle and
C                                   increased number of templates to 20
C
C
C  LINK..
C     DK1:SIGVER<DK1:SIGVER/CC,PEN120,DEWLIB/CC,DK:FTNLIB[1,1]/L/U/E
C------------------------------------------------------------------------
      LOGICAL DEBUG,CHANGE,LATER,ARCTAN,NEGATE
C  This COMMON for the display routines
      COMMON /VGD1/ INDISP,MAXDIS,DISBUF(2500)

DIMENSION IRATES(6),IARRAY(6),ICTO(37),NDATE(5),NTIME(4)
     +         ,STATID(2,10),STAT(10,3),DEVICE(3),FAKE(2)
     +         ,IZEROS(3),IPENUP(50),CTO(16),TYPMEA(3),YESNO(2)
     +         ,TEMPS(50,4),TEMPID(20),NSPTEM(20)
     +         ,VARS(50),WGTS(50),VARSID(50),JDATA(1000,3)
      DIMENSION VARIDP(10),VARIDX(10),VARIDY(10),VARID1(20)
      EQUIVALENCE (VARSID( 1),VARIDP),(VARSID(11),VARIDX)
     +           ,(VARSID(21),VARIDY),(VARSID(31),VARID1)
     +           ,(STAT,VARS),(ICTO,CTO)
      EQUIVALENCE (JDATA,TEMPS),(JDATA(1,2),RDF),(JDATA(101,2),WDF)

DIMENSION CT01(15),CT02(15),CT03( 9),CT04( 7),CT05(12)
     +         ,CT08( 6),CT09( 8),CTOV( 8)
C    Scratch arrays (Note EQUIVALENCE with JDATA)
      DIMENSION WDF(50), RDF(50)

C     Set up comments to the operator
      DATA CTOV /'A=Ab','s Di','f, C','=Cor','rel,',' R=R'
     +          ,'MS d','if '/
      DATA CT01 /'RATE',' SIG','NAT ','AUTH','OR D','EVIC','E TE'
     +          ,'MPLA','TE  ','MEAS','URE ','   L','AG  ','NORM'
     +          ,'AL L','ATER',' ANG','LE  '/
      DATA CT02 /'To c','hang','e pa','rame','ters',',   ',' ty','pe o','ne o'
     +          ,'f th','e fo','llow','ing ','char','acte','rs  '/
      DATA CT03 /'Do y','ou w','ant ','to U'
     +          ,'pdat','e th','e te','mpla','te? '/
      DATA CT04 /'Type',' Y f','or Y','es o','r N ','for ','No. '/
```

```
      DATA CT05 /'    ',' ','    ',' RM','S Di','ffer'
     +          ,'ence',' A','ve. ','Abs.',' Dif','f   '/
      DATA CT08 /'SPAC','E to',' beg','in s','ampl','ing '/
      DATA CT09 /'Any ','char','acte','r ab','orts',' sam','plin','g  '/
C     Set default values of some parameters
      DATA  CUTOFF/2.0/,NXTPRO/0/ ,IPLPEN/2/,IRATE/2/,TIMLAG/2.0/
      DATA  TEMPID/20*'    '/, NSPTEM/20*0/,ITEMNO/20/,MEASUR/3/
     +     ,SIGNAT/'JSO'/, AUTHOR/'TRUE'/, LATER/.TRUE./, NORMAL/1/
     +     ,NPRINT/99/, IPCUT/50/, ARCTAN/.FALSE./, NEGATE/.FALSE./
C     Initialize constants for the program
      DATA  IRATES/120,60,40,30,24,20/
      DATA  MAXPTS/1000/,MAXPUP/50/,MAXTEM/20/,MAXVAR/50/
      DATA  TRUE/'TRUE'/,T/'T   '/, FAKE/'FORG','ERY1'/,ICR/020015/
      DATA  XNOT/' NOT'/, BLANK/'    '/
      DATA  DEVICE/'Plot','Pen ','Both'/, YESNO/'Yes ',' No '/
      DATA  STATID  /  'AVE ','    ','SDV ','    ','Max ','    '
     +     ,'Min ','    ','Ave ','Abs ','Ave ','Pos ','Num ','Pos '
     +     ,'Ave ','Neg ','Num ','Neg ','0 X!','ngs '/
      DATA  TYPMEA/'AbsD','Corr','RMSD'/

C     Identification and number of variables used in correlation
      DATA  NUMVAR/44/, SUMWGT/17.0/
      DATA  WGTS/1.0, 1.0, 0.0, 0.0, 0.0, 0.0, 1.0, 0.0, 1.0, 0.0
     +          ,1.0, 1.0, 0.0, 0.0, 0.0, 0.0, 1.0, 0.0, 1.0, 0.0
     +          ,1.0, 1.0, 0.0, 0.0, 0.0, 0.0, 1.0, 0.0, 1.0, 0.0
     +          ,0.0, 0.0, 0.0, 1.0, 1.0, 0.0, 0.0, 0.0, 0.0
     +          ,1.0, 0.0, 1.0, 0.0, 1.0
     +          ,1.0, 0.0, 0.0, 0.0, 0.0, 0.0/
      DATA  VARIDP/'Pave','Psdv','Pmax','Pmin','Pabs',' +P ','#+P '
     +          ,' -P ','#-P ','#0 P'/
      DATA  VARIDX/'Xave','Xsdv','Xmax','Xmin','Xabs',' +X ','#+X '
     +          ,' -X ','#-X ','#0 X'/
      DATA  VARIDY/'Yave','Ysdv','Ymax','Ymin','Yabs',' +Y ','#+Y '
     +          ,' -Y ','#-Y ','#0 Y'/
      DATA  VARID1/'Prge','Xrge','Yrge','Pmxm','Xmxm','Ymxm'
     +          ,'Pmnm','Xmnm','Ymnm'
     +          ,'time','# up','T up','# dn','T dn','atan'
     +          , 5*'    '/
C-----------------------------------------------------------------
C     statement functions .........
C     correlation
      CORREL(SX,SY,QX,QY,XY,S)  =  (XY - SX*SY/S)
     +                         / SQRT((QX-SX*SX/S)*(QY-SY*SY/S))
C     root mean square difference
      RMSDIF(QX,QY,XY,S)        =  SQRT((QX + QY - 2.0*XY)/S)
C-----------------------------------------------------------------
   1   FORMAT (I1,'Response'I4,5X,5A2,3X,4A2,3X,4A5,' Normalized'
     +         / 10X,I3' samples in the template')
   2   FORMAT (I3,2A7,A6,I5,I4,A5,F5.2,F6.1,A8,L4,2X,L4,I6)

3   FORMAT (15X'SAMPLE T O T A L  POINTS    ZERO LEVELS'
     +         /' SIGNAT AUTHOR  RATE  SAMPLES TIME    KEPT '
     +         ,'    P       X      Y')
   4   FORMAT (1X,A5,4X,A4,I6,I8,F7.2,I7,3X,3I5
     +         //4X' Pen Down Times'/(7X,5(2X,I4'-'I4)))
   5   FORMAT (1X,20A4)
   6   FORMAT ('Response'I4)

10   FORMAT (12X,F11.3,9X,F12.2)

20   FORMAT (27X'difference'6X'T E M P L A T E'
     +         /' VARIABLE WEIGHT  SAMPLE  Simple  /SDV    AVERAGE'
     +         ,'  STD.DEV. MAXIMUM MINIMUM')
  21   FORMAT (1X,I3,A5,F7.2,F8.1,F7.2,F8.3,F10.2,F10.2,2F9.2)
  23   FORMAT (26X'Before Update'4X'After updating with response'I3)
  24   FORMAT (26X'Before Update'4X'Before updating with response'I3)

31   FORMAT (29X'D U R A T I O N'
     +         /21X'NUMBER  SAMPLES   TIME'
     +         /10X' PEN UP   'I5,I9,F9.2
     +         /10X' PEN DOWN 'I5,I9,F9.2)
  32   FORMAT (/5X'STATISTICS'/18X'Signature'30X'TEMPLATE'
     +         /9X,2(12X'P'8X'X'8X'Y'))
  33   FORMAT (7X,2A4,3F9.2,4X,3F9.2)
  40   FORMAT(' index initials NSPTEM')
  41   FORMAT(1X,I5,3X,A4,I7)
C-----------------------------------------------------------------
```

```
C     Set default value of parameters
      MAXLAG = TIMLAG*IRATES(IRATE)
      CALL SETERR(6,-1)
      CALL DATE(NDATE)
      CALL TIME(NTIME)
      NDEBUG = 0
      DEBUG  = NDEBUG.NE.0
C     Initialize a counter for the number of responses
      NUMRES = 0
C     Set up display
      MAXDIS = 6000
      CALL DPON
      CALL MOVBM(-2047,-2047)
      CALL IVECT(-2047, 2047,0)
      CALL IVECT( 2047, 2047,0)
      CALL IVECT( 2047,-2047,0)
      CALL IVECT(-2047,-2047,0)
      CALL MOVBM(-2000,-1024)
      CALL CHARS(CTO1,36,1)
      CALL GETIND(INDBEG)
C     Initialize a disk file for the data file
      CALL SETFIL (3, 'DATA', IERR3, 'DK', 1)
      REWIND 3
C     Initialize a disk file for the templates
      LENTEM = 50*4*2 + 2 + 1
      CALL SETFIL (2, 'SIGVER.TEM', IERR2, 'DK', 1)
      DEFINE FILE 2(MAXTEM,LENTEM,U,INDEX2)
C     scan template file to get idents and number of responses
      PRINT 40
      DO 90 I=1,MAXTEM
         READ (2'I) TEMPID(I),NSPTEM(I),TEMPS
         IF(NSPTEM(I) .GT. 0) PRINT 41, I,TEMPID(I),NSPTEM(I)
90    CONTINUE
      IF (TEMPID(ITEMNO) .NE. 0.0) SIGNAT = TEMPID(ITEMNO)
C---------------------------------------------------------------------
C     Allow the operator to change parameters
100   CALL SETIND(INDBEG)
      CALL MOVBM(-2000, -1216)
      CALL CHARS(CTO2,29,2)
      CALL MOVBM(-1800, -1280)
      CALL CHARS('a c e f l m n o r s t v w z ', 14, 1)
      CALL MOVBM(-1800,-1344)
      CALL CHARS(CTO8,12,2)
      I = NUMRES + 1
      ENCODE (12,6,ICTO) I
      CALL MOVBM(-2000,-960)
      CALL CHARS(ICTO, 6,1)
      CALL GETIND(INDCHA)

C     Update list of parameters
110   CALL SETIND(INDCHA)
      NUM = 0
      IF (ITEMNO .GT. 0) NUM = NSPTEM(ITEMNO)
      ENCODE (74,2,ICTO)  IRATES(IRATE),SIGNAT,AUTHOR
     +                   ,DEVICE(IPLPEN),ITEMNO,NUM,TYPMEA(MEASUR)
     +                   ,CUTOFF,TIMLAG,YESNO(NORMAL),LATER,ARCTAN
     +                   ,INDISP
      CALL MOVBM(-2000, -1088)
      CALL CHARS(ICTO,37,1)

120   IF (LCHAR(ICH) .EQ. 0) GO TO 120
      JCH = ICH - 'a' + 1
      IF (JCH.GT.0 .AND. JCH.LT.27) GO TO 140
      IF (ICH .EQ. 'A') GO TO 510
      IF (ICH .EQ. 'D') GO TO 540
      IF (ICH .EQ. 'E') GO TO 9000
      IF (ICH .EQ. 'M') GO TO 630
      IF (ICH .EQ. 'N') GO TO 640
      IF (ICH .EQ. 'P') GO TO 660
      IF (ICH .EQ. 'S') GO TO 690

IF (ICH .EQ. ' ') GO TO 900
      IF (ICH .EQ. ICR) GO TO 900
      IF (IBUTTN(I) .NE. 0) GO TO 900
130   GO TO 120
```

```
      140      GO TO (210,130,230,240,250,260,130,130,130,130
     +             ,130,320,330,340,130,360,130,380,390,400
     +             ,130,420,430,130,130,460)                    ,JCH
C     - - - - - - - - - - - - - - - - - - - - - - - - - - - - - - -
C     Identification of the Author
      210      AUTHOR = GETEXT('AUTH',AUTHOR)
               IF (AUTHOR .EQ. SIGNAT)  AUTHOR = TRUE
               IF (AUTHOR .EQ. T    )   AUTHOR = TRUE
               GO TO 110
C     - - - - - - - - - - - - - - - - - - - - - - - - - - - - - - -
C     Correlation cutoff for separating TRUE signatures from FORGERIES
      230      CUTOFF = VALUE('CUT ',CUTOFF,CHANGE)
               GO TO 110
C     - - - - - - - - - - - - - - - - - - - - - - - - - - - - - - -
C     pen down pressure threshold -- pressure > IPCUT implies
C     pen down (writing in progress)
      240      OLD = IPCUT
               IPCUT = VALUE('p dn', OLD,CHANGE)
               GO TO 110
C     - - - - - - - - - - - - - - - - - - - - - - - - - - - - - - -
C     EXIT to operating system
      250      GO TO 9000
C     - - - - - - - - - - - - - - - - - - - - - - - - - - - - - - -
C     change sampling frequency
      260      GO TO 380
C     - - - - - - - - - - - - - - - - - - - - - - - - - - - - - - -
C     change flag which tells whether to accumulate statistics on the
C     on the fly or compute them after signature is complete and the
C     time series data for each chanel have been normalized to mean 0
C     Standard deviation 10.
      320      LATER = .NOT.LATER
               GO TO 110
C     - - - - - - - - - - - - - - - - - - - - - - - - - - - - - - -
C     Select a measure for Verifying signatures --
C        A = Absolute Difference    R = RMS Difference
      330      CALL GETIND(IND)
               CALL MOVBM (-2000, -2000)
               CALL CHARS(CTOV,15,1)
      331      IF (LCHAR(ICH) .EQ. 0)  GO TO 331
               IF (ICH.EQ.'A' .OR. ICH.EQ.'a')  GO TO 332
               IF (ICH.EQ.'R' .OR. ICH.EQ.'r')  GO TO 336
               GO TO 331

332      MEASUR = 1
               GO TO 338
      336      MEASUR = 3

338      CALL SETIND(IND)
               GO TO 110
C     - - - - - - - - - - - - - - - - - - - - - - - - - - - - - - -
C     Normalize the variables by dividing by the template standard
C     deviation if NORMAL=1
      340      NORMAL = 3 - NORMAL
               GO TO 110
C     - - - - - - - - - - - - - - - - - - - - - - - - - - - - - - -
C     Change device type from  pen to platen (or vice versa)
      360      IPLPEN = 3 - IPLPEN
               GO TO 110
C     - - - - - - - - - - - - - - - - - - - - - - - - - - - - - - -
C     Sample frequency rate
      380      OLD = IRATES(IRATE)
               I   = VALUE('RATE', OLD, CHANGE)
               IF (.NOT. CHANGE) GO TO 120
               DO 382 IRATE = 1,6
                 IF (IRATES(IRATE) .LE. I)  GO TO 384
      382      CONTINUE
               IRATE = 2
      384      MAXLAG = TIMLAG*IRATES(IRATE)
               GO TO 110
C     - - - - - - - - - - - - - - - - - - - - - - - - - - - - - - -
C     Identification of the Signature
      390      SIGNAT = GETEXT('SIGN',SIGNAT)
               IF (SIGNAT .EQ. AUTHOR)  AUTHOR = TRUE
```

```
C     select proper template for this signature
          IZERO = 0
          DO 392 I=1,MAXTEM
            ITEMNO = I
            IF (TEMPID(I) .EQ. SIGNAT) GO TO 394
            IF (NSPTEM(I) .EQ.    0 )  IZERO = I
  392     CONTINUE
          ITEMNO = IZERO
          GO TO 110
  394     READ (2'ITEMNO) TEMPID(ITEMNO),NSPTEM(ITEMNO),TEMPS
          GO TO 110
C     - - - - - - - - - - - - - - - - - - - - - - - - - - - - -
C     Time lag for deciding signature is over (seconds)
C     Changed to maximum number of samples pen can be up
  400     TIMLAG = VALUE('TLAG', TIMLAG,CHANGE)
          MAXLAG = TIMLAG*IPATES(IRATE)
          GO TO 110
C     - - - - - - - - - - - - - - - - - - - - - - - - - - - - -
C     allow the operator to select the measure for signature verification
  420     GO TO 330
C     - - - - - - - - - - - - - - - - - - - - - - - - - - - - -
C     change the WEIGHT on each variable that determines its influence
C     on the measure of similarity between the signature and the template
  430     SUMWGT = 0.0
          DO 432 I=1,NUMVAR
            WGTS(I) = VALUE(VARSID(I), WGTS(I), CHANGE)
            IF (WGTS(I) .NE. 0.0) SUMWGT = SUMWGT + 1.0
  432     CONTINUE
          GO TO 110
C     - - - - - - - - - - - - - - - - - - - - - - - - - - - - -
C     Zero the template
  460     CONTINUE
          IF (ITEMNO .LE. 0) GO TO 110
          NSPTEM(ITEMNO) = 0
          WRITE (2'ITEMNO) TEMPID(ITEMNO),NSPTEM(ITEMNO)
          GO TO 110
C     - - - - - - - - - - - - - - - - - - - - - - - - - - - - -
C     Set flag for calculating angle
  510     ARCTAN = .NOT.ARCTAN
          NUMVAR = 44
          IF (ARCTAN) NUMVAR=45
          SUMWGT = 0.0
          DO 511 I=1,NUMVAR
            IF (WGTS(I) .GT. 0.0) SUMWGT=SUMWGT+1.0
  511     CONTINUE
          GO TO 110
C     - - - - - - - - - - - - - - - - - - - - - - - - - - - - -
C     Debugging printout switch
  540     OLD    = NDEBUG
          NDEBUG = VALUE('DBUG', OLD, CHANGE)
          DEBUG  = NDEBUG.NE.0
          GO TO 110
C     - - - - - - - - - - - - - - - - - - - - - - - - - - - - -
C     exit to MAE (text editor)
  630     NXTPRO = 2
          GO TO 9000
C     - - - - - - - - - - - - - - - - - - - - - - - - - - - - -
C     Change sign of pressure to negative
  640     NEGATE = .NOT. NEGATE
          GO TO 110
C     - - - - - - - - - - - - - - - - - - - - - - - - - - - - -
C     allow the operator to specify amount of Printout
  660     OLD    = NPRINT
          NPRINT = VALUE('PRNT',OLD,CHANGE)
          GO TO 110
C     - - - - - - - - - - - - - - - - - - - - - - - - - - - - -
C     Return to program SIG11
  690     NXTPRO = 1
          GO TO 9000
C     - - - - - - - - - - - - - - - - - - - - - - - - - - - - -
  900     CONTINUE
C*********************************************************
C     Loop to sample pen, save only PEN>0, count the number of pen-ups
```

```
C     Use algorithms developed on the 6400.
C     Sample keyboard within loop -- if char -- abort
 1000     CONTINUE
          IF (.NOT.LATER) GO TO 1010
              WRITE (2'ITEMNO)   TEMPID(ITEMNO),NSPTEM(ITEMNO),TEMPS
              CALL INITFX(0,JDATA,MAXPTS*3)
 1010     CALL SETIND(INDBEG)
          ENCODE (74,2,ICTO)   IRATES(IRATE),SIGNAT,AUTHOR
     +                        ,DEVICE(IPLPEN),ITEMNO,NUM,TYPMEA(MEASUR)
     +                        ,CUTOFF,TIMLAG,YESNO(NORMAL),LATER,ARCTAN
     +                        ,INDISP
          CALL MOVBM(-2000, -1088)
          CALL CHARS(ICTO,37,1)
          CALL MOVBM(-1600, -1216)
          CALL CHARS(CTO9,15,1)
C     Initialize counters for sampling
          NUMPTS  =  0
          NZEROS  =  0
          CALL MOVBM(-2000, -924)
          CALL CHARS('START WRITING ',7,3)
          CALL MOVBM(0,1024+IPCUT)
          CALL IVECT(-2040,1024+IPCUT,1)
          CALL AIRSET(2)
C     First 5 samples define the zero level
          IZEROS(1)  =  0
          IZEROS(2)  =  0
          IZEROS(3)  =  0
          CALL PENON(IRATE)
          DO 1030  I=1,5
             CALL PENVAL(IARRAY,IFLAG)
C            Y from pen and plate are positive down--should be + up
             IARRAY(3)  =  -IARRAY(3)
C            Plate has pressure from 0 to -5 volts (23 Nov 74)
             IF (NEGATE) IARRAY(1) = -IARRAY(1)
             DO 1020  K=1,3
                IZEROS(K)  =  IZEROS(K) + IARRAY(K)
 1020        CONTINUE
 1030     CONTINUE
          DO 1040  K=1,3
             IZEROS(K)  =  (IZEROS(K)+2)/5
 1040     CONTINUE
          NZEROS  =  5
          NUP     =  0
          NSAMPS  =  5
          CALL MOVBM(-2040,IARRAY(1)+1024)
          CALL GETIND(INDBOX)

C     Main loop to gather samples starts here
 1100     CONTINUE
          IF (LCHAR(ICH) .NE. 0) GO TO 2000
          CALL PENVAL(IARRAY,IFLAG)
C         Y from pen and plate are positive down--should be + up
          IARRAY(3)  =  -IARRAY(3)
C         Plate has pressure from 0 to -5 volts (23 Nov 74)
          IF (NEGATE) IARRAY(1) = -IARRAY(1)
          CALL SETIND(INDBOX)
C     Display time series of pressure -- must be before LOST message
          CALL AXVECT(IARRAY(1)+1024, 0)
          CALL GETIND(INDBOX)
C     Subtract zero levels
          DO 1110  K=1,3
             IARRAY(K)  =  IARRAY(K) - IZEROS(K)
 1110     CONTINUE
C     Check for lost data
          IF (IFLAG .EQ. 0) GO TO 1120
             CALL MOVBM(0,0)
             CALL CHARS('LOST',2,3)
C     Count number of samples
 1120     NSAMPS  =  NSAMPS + 1
          IF (IARRAY(1) .GT. IPCUT) GO TO 1150
          NZEROS  =  NZEROS + 1
C     Pressure is zero -- see if it has just gone zero
          IF (NZEROS .GT. MAXLAG) GO TO 1130
          IF (NZEROS .GT.  1   ) GO TO 1100
C     Pressure just turned zero -- tally as pen up
          IF ( NUP    .LT. MAXPUP) NUP = NUP + 1
          IPENUP(NUP)  =  NSAMPS
```

```
C       Also set next two points to the zero level
            NUMPTS = NUMPTS + 2
            GO TO 1100
C
C       5 sec since activity on pressure, either finished
C         or haven't started
 1130       IF (NUMPTS .GT. 0 ) GO TO 2000
            ICH = 1
            IF (NZEROS .GT. 3000) GO TO 2000
            GO TO 1100
C
C       Pressure is non-zero -- writing in progress
 1150       CONTINUE
            IF (NZEROS .EQ. 0) GO TO 1170
C       Writing just started -- also save two zero values
            NUMPTS = NUMPTS + 2
            IF (NUP .LT. MAXPUP) NUP = NUP + 1
            IPENUP(NUP) = NSAMPS
            NZEROS = 0
C       Save the sample
 1170       CALL ADDUP(STAT,IARRAY,NUMPTS,LATER)
            IF (.NOT.LATER) GO TO 1100
            DO 1180  K=1,3
                JDATA(NUMPTS,K) = IARRAY(K)
 1180       CONTINUE
            IF (NUMPTS .LT. MAXPTS) GO TO 1100

C----------------------------------------------------------------
C   Signature has ended
 2000       CALL PENOFF
C       Check for abort key
            IF (ICH .NE. 0) READ (2'ITEMNO) TEM,J,TEMPS
            IF (ICH .NE. 0) GO TO 100
            CALL MOVBM(-2000, -750)
            CALL CHARS('SIGNATURE COMPLETE', 9,3)
C       Compute statistics on this signature data
            NUMRES = NUMRES + 1
            WRITE(3) SIGNAT,AUTHOR,NDATE,NTIME,NUMRES,
         +           IRATES(IRATE),NUMPTS,NUP,IPLPEN,
         +           (IPENUP(I), I=1,NUP),
         +           ((STAT(I,K), K=1,3), I=1,2),
         +           ((JDATA(I,K), I=1,NUMPTS), K=1,3)
            IF ( LATER ) CALL STATS(STAT,JDATA,NUMPTS,3,MAXPTS)
            IF ( ARCTAN ) VARS(45)=ANGLE(JDATA,NUMPTS,MAXPTS)
            IF ( LATER ) READ (2'ITEMNO) TEM,J,TEMPS
            IF (.NOT.LATER) CALL VSTATS(STAT,NUMPTS,3,LATER)
C       Total time of signature in samples and seconds
            NTOTIM = IPENUP(NUP) - IPENUP(1)
            TSEC   = FLOAT(NTOTIM)/FLOAT(IRATES(IRATE))
C       Total pen up time .samples then seconds)
            NTOTDN = 0
            NTOTUP = 0
            J      = NUP - 1
            IF (J .LT. 1) GO TO 2030
            DO 2010  I=1,J,2
                NTOTDN = NTOTDN + (IPENUP(I+1)-IPENUP(I))
 2010       CONTINUE
C       total pen down time (samples then seconds)
            IF (J .EQ. 1) GO TO 2030
            DO 2020  I=2,J,2
                NTOTUP = NTOTUP + (IPENUP(I+1)-IPENUP(I))
 2020       CONTINUE
 2030       TOTDN  = FLOAT(NTOTDN) / FLOAT(IRATES(IRATE))
            TOTUP  = FLOAT(NTOTUP) / FLOAT(IRATES(IRATE))
            JPENUP = NUP/2 - 1
            JPENDN = NUP/2
            VARS(40) = TSEC
            VARS(41) = JPENUP
            VARS(42) = TOTUP
            VARS(43) = JPENDN
            VARS(44) = TOTDN
            DO 2040  K=1,3
C           range of values (max - min)
                VARS(K+30) = STAT(3,K) - STAT(4,K)
C           maximum minus the average
                VARS(K+33) = STAT(3,K) - STAT(1,K)
```

```
C              minimum minus the average
               VARS(K+36) = STAT(1,K) - STAT(4,K)
 2040     CONTINUE
C   - - - - - - - - - - - - - - - - - - - - - - - - - - - - -
          CALL INITRL(0.0, RDF, MAXVAR)
          CALL INITRL(0.0, WDF, MAXVAR)
          DEBUG = .FALSE.
C     Compute correlation of current signature with existing template
 3000     CONTINUE
          IF (    ITEMNO      .LE. 0)  GO TO 4000
          IF (NSPTEM(ITEMNO) .LE. 0)  GO TO 4000
C     Zero variables for accumulating sums
          ABSDIF = 0.0
          SSQDIF = 0.0

C     Accumulate sums
          J = NORMAL
          IF (NSPTEM(ITEMNO) .EQ. 1)  J = 0
          DO 3020  I=1,NUMVAR
            SIG     = WGTS(I)*VARS(I)
            TEM     = WGTS(I)*TEMPS(I,1)
            RDF(I)  = SIG - TEM
            IF ( J  .NE. 1 )  GO TO 3010
            SDV     = TEMPS(I,2)
C       Setting SDV=0.01 causes significance error, hence use 1.0
            IF (SDV .LT. 0.01)  GO TO 3010
            SIG     = SIG/SDV
            TEM     = TEM/SDV
 3010       ABSDIF  = ABSDIF + ABS(SIG-TEM)
            WDF(I)  = SIG - TEM
            SSQDIF  = SSQDIF + WDF(I)**2
 3020     CONTINUE C     Calculate the different measures
          RMS = SQRT(SSQDIF/SUMWGT)
          DIF = ABSDIF/SUMWGT
          CALL MOVBM(-700,-320)
          CALL CHARS(CT05,23,1)
          ENCODE (44,10,ICTO)  RMS,DIF
          CALL MOVBM(-700,-384)
          CALL CHARS(ICTO,22,1)
C     Select a measure for comparison
          GO TO (3110,3130,3130),MEASUR
C     Absolute difference
 3110     IF (DIF - CUTOFF)  3220,3220,3210
C     Root Mean Square Difference
 3130     IF (RMS - CUTOFF)  3220,3220,3210

C     This is a FORGERY
 3210     CALL MOVBM(0,-256)
          CALL CHARS(FAKE,4,3)
          GO TO 3300

C     A TRUE signature has been found
 3220     CONTINUE
          CALL MOVBM(0,-256)
          CALL CHARS(TRUE,2,3)

C     Print and display statistics
 3300     CONTINUE
          CALL SCATT(WGTS,VARS,TEMPS(1,1),NUMVAR,MAXVAR,NORMAL)
          I   = 1
          TEM = XNOT
          IF (NPRINT .LE. 5)  I = 0
          IF (DEBUG) I = 0
          IF (LATER) TEM = BLANK
          PRINT 1, I,NUMRES,NDATE,NTIME, SIGNAT,AUTHOR
     +        ,DEVICE(IPLPEN),TEM,NSPTEM(ITEMNO)
          PRINT 5,CT05
          PRINT 5,(CTO(I),I=1,11)
          IF (NPRINT .LE. 5)  GO TO 3390
          PRINT 3
          PRINT 4, SIGNAT,AUTHOR,IRATES(IRATE),NTOTIM,TSEC,NUMPTS
     +        ,IZEROS,(IPENUP(I),I=1,NUP)
          PRINT 31, JPENUP,NTOTUP,TOTUP,JPENDN,NTOTDN,TOTDN
          IF (NPRINT .LT. 10)  GO TO 3390
```

```
              PRINT 32
              DO 3310 J = 1,10
                 KE = J + 20
                 PRINT 33,STATID(1,J),STATID(2,J),(STAT(J,K),K=1,3)
       +                ,(TEMPS(K,1),K=J,KE,10)
 3310         CONTINUE
 3390         DEBUG = NDEBUG.NE.0

C     -------------------------------------------
C        Allow operator to update template on command
 4000         CONTINUE
              IF (ITEMNO .LE. 0) GO TO 5000
              CALL GETIND(IND)
              CALL MOVBM(-1000,-1500)
              CALL CHARS(CTO3,18,2)
              CALL MOVBM(-900,-1564)
              CALL CHARS(CTO4,14,1)
 4100         IF (LCHAR(ICH) .EQ.      0    )   GO TO 4100
              IF (ICH.EQ.'P' .OR. ICH.EQ.'p')   GO TO 4200
              IF (ICH.EQ.'Y' .OR. ICH.EQ.'y')   GO TO 4300
              IF (ICH.EQ.'N' .O . ICH.EQ.'n')   GO TO 5000
              IF (ICH.EQ.'D')  DEBUG = .TRUE.
              IF (ICH.EQ.'D'                )   GO TO 3000
              GO TO 4100

C        Print list of parameter values and differences prior to updating
 4200         IF (ITEMNO .LE. 0) GO TO 4100
              PRINT 24,NUMRES
              PRINT 20
              DO 4210 I=1,NUMVAR
                 PRINT 21,I,VARSID(I),WGTS(I),VARS(I),RDF(I),WDF(I)
       +                ,(TEMPS(I,J),J=1,4)
 4210         CONTINUE
              GO TO 4100

C        Update the template
 4300         CONTINUE
              IF (NSPTEM(ITEMNO) .LE. 0) GO TO 4400
              NUM = MIN0(NSPTEM(ITEMNO),7)
              DO 4310 I=1,NUMVAR
                 SUM = TEMPS(I,1)*NUM
                 SSQ = TEMPS(I,2)**2 *(NUM-1) + SUM*SUM/NUM + VARS(I)**2
                 SUM = SUM + VARS(I)
C                modify the averages
                 TEMPS(I,1) = SUM / (NUM+1)
C                modify the standard deviation
                 TEMPS(I,2) = SQRT((SSQ - SUM*SUM/(NUM+1)) / NUM)
C                modify the maximum and minimum if necessary
                 IF (VARS(I).GT.TEMPS(I,3)) TEMPS(I,3)= VARS(I)
                 IF (VARS(I).LT.TEMPS(I,4)) TEMPS(I,4)= VARS(I)
 4310         CONTINUE
              NSPTEM(ITEMNO) = NSPTEM(ITEMNO) + 1
              GO TO 4500

C     Start a new template
 4400         CONTINUE
              DO 4410 I=1,NUMVAR
                 TEMPS(I,1) = VARS(I)
                 TEMPS(I,2) = 0.0
                 TEMPS(I,3) = VARS(I)
                 TEMPS(I,4) = VARS(I)
 4410         CONTINUE
              NSPTEM(ITEMNO) = 1
              TEMPID(ITEMNO) = SIGNAT C     Print results of template update
 4500         CALL SETIND(IND)
              WRITE (2'ITEMNO) TEMPID(ITEMNO),NSPTEM(ITEMNO),TEMPS
              IF (NPRINT .LT. 21) GO TO 5000
              I = 1
              TEM = XNOT
              IF (LATER) TEM = BLANK
```

```
        IF (NSPTEM(ITEMNO) .EQ. 1)  PRINT 1, I,NUMRES,NDATE,NTIME
       +           , SIGNAT,AUTHOR,DEVICE(IPLPEN),TEM,NSPTEM(ITEMNO)
        PRINT 23,NUMRES
        PRINT 20
        DO 4510  I=1,NUMVAR
          PRINT 21,I,VARSID(I),WGTS(I),VARS(I),RDF(I),WDF(I)
       +          ,(TEMPS(I,J),J=1,4)
 4510   CONTINUE
C  - - - - - - - - - - - - - - - - - - - - - - - - - - - - - - -
C    All processing has been done, let operator choose another option
 5000   GO TO 100
C--------------------------------------------------------------------
 9000   CONTINUE
        CALL DPOFF
        IF (NXTPRO .EQ. 1)  CALL RUN('DK1:SIG11')
        IF (NXTPRO .EQ. 2)  CALL RUN('DK0:MAE')
        STOP
      END C  SIGVER.FTN
      SUBROUTINE ADDUP(SS,ID,NUM,LATER)
C     Copyright 1975  Stanford Research Institute
C         December 26, 1974
C   Compute sums for statistics over 3 channels of data ID
C
C  NUM  The number of samples in the sums
C  ID(K) amplitude for channel K
C  SS(J,K) statistic J for channel K--J=1=Ave, J=2=Sdv, J=3=Max, J=4=Min
C        J=5=Ave Abs, J=6=Ave Pos, J=7=Num Pos, J=8=Ave Neg
C        J=9=Num Neg, J=10=Number of Zero Crossings
C  NCH     number of channels
C  LATER   flag to tell if statistics are to be accumulated on the fly
C          or after sampling is finished
C---------------------------------------------------------------------
      LOGICAL LATER
      DIMENSION SS(10,3),ID(3),PD(3)
      DATA  NCH/3/
C---------------------------------------------------------------------
C
      NUM = NUM + 1
C   On the first call, there are three points in the sums:
C      two preceeding zeros and the current value
      IF (NUM .LE. 3)  GO TO 20

C    Accumulate sums, etc. for each channel
      DO 10 K=1,NCH
        JD        = ID(K)
        D         = JD
        SS(1,K)   = SS(1,K) + D
        SS(2,K)   = SS(2,K) + D*D
        IF (LATER)  GO TO 10
        SS(5,K)   = SS(5,K) + ABS(D)
        IF (  D .GT. SS(3,K))   SS( 3,K) = D
        IF (  D .LT. SS(4,K))   SS( 4,K) = D
        IF (  JD   .GT.   0)    SS( 6,K) = SS( 6,K) + D
        IF (  JD   .GT.   0)    SS( 7,K) = SS( 7,K) + 1.0
        IF (  JD   .LT.   0)    SS( 8,K) = SS( 8,K) + D
        IF (  JD   .LT.   0)    SS( 9,K) = SS( 9,K) + 1.0
        IF (PD(K)*D .LT. 0.0)   SS(10,K) = SS(10,K) + 1.0
        PD(K)  = D
 10   CONTINUE
      RETURN C    First value in sums -- INITIALIZE
 20   CONTINUE
      DO 30  K=1,3
        CALL INITRL(0.0, SS(4,K), 7)
        D        = ID(K)
        PD(K)    = D
        SS(1,K)  = D
        SS(2,K)  = D*D
        IF (LATER)  GO TO 30
        SS(3,K)  = D
```

```
              SS(5,K) = ABS( )
              IF (D .GT. 0.0)  SS(6,K) = D
              IF (D .GT. 0.0)  SS(7,K) = 1.0
              IF (D .LT. 0.0)  SS(8,K) = D
              IF (D .LT. 0.0)  SS(9,K) = 1.0
   30      CONTINUE
           RETURN
C--------------------------------------------------------------------
        END

C  SIGVER.FTN
        FUNCTION ANGLE(JDATA,NUMPTS,MAXPTS)
C       Copyright 1975  Stanford Research Institute
C              March 12, 1974
C    Calculate average writing angle

DIMENSION JDATA(MAXPTS,3)

SUM = 0.0

DO 10  I=1,NUMPTS
               X = JDATA(I,2)
               Y = JDATA(I,3)
               IF (X.EQ.0.0 .AND. Y.EQ.0.0) GO TO 10
               SUM = SUM + ATAN2(Y,X)
   10      CONTINUE
           ANGLE = SUM/NUMPTS
           RETURN
C--------------------------------------------------------------------
        END

C  SIGVER.FTN
        SUBROUTINE SCATT(W,XX,YY,N,M,L)
C       Copyright 1975  Stanford Research Institute
C              December 18, 1974
C    Scatterplot of the XX vs YY data in top right quadrant of screen C    M is the maximum number of points
C    N is the number of points for the plot
C    L is a switch indicating how to scale the data
C    W is an array of weights to be applied to both sets of data

DIMENSION XX(M),YY(M,4),W(M),ICH(2)

C   Display boundaries -- use top-right quadrant
        DATA  MINHOR,MAXHOR, MINVER,MAXVER/0,2040, 0,2047/
C--------------------------------------------------------------------
    1      FORMAT (I2)
C--------------------------------------------------------------------
C     Calculate maximum and minimum data values
  100      XMAX = -1.0E10
           YMAX = -1.0E10
           XMIN =  1.0E10
           YMIN =  1.0E10

DO 120  I=1,N
              X = XX(I )*W(I)
              Y = YY(I,1)*W(I)
              IF (L .NE. 1  ) GO TO 110
              S = YY(I,2)
              IF (S .LT. 0.01) GO TO 110
              X = X / S
              Y = Y / S
  110         IF (X.EQ.0.0 .AND. Y.EQ.0.0) GO TO 120
              IF (X .LT. XMIN)  XMIN = X
              IF (X .GT. XMAX)  XMAX = X
              IF (Y .LT. YMIN)  YMIN = Y
              IF (Y .GT. YMAX)  YMAX = Y
  120      CONTINUE

IF (XMAX .EQ. XMIN)  XMAX = XMIN + 1.0
           IF (YMAX .EQ. YMIN)  YMAX = YMIN + 1.0
           SX = (MAXHOR-MINHOR)/(XMAX-XMIN)
           SY = (MAXVER-MINVER)/(YMAX-YMIN)
```

```
C     Plot the data points by variable number
200       DO 220 I=1,N
              X = XX(I  )*W(I)
              Y = YY(I,1)*W(I)
              IF (L .NE. 1   ) GO TO 210
              S = YY(I,2)
              IF (S .LT. 0.01) GO TO 210
              X = X / S
              Y = Y / S
210           IF (X.EQ.0.0 .AND. Y.EQ.0.0) GO TO 220
              IH = (X-XMIN)*SX + MINHOR
              IV = (Y-YMIN)*SY + MINVER
              CALL MOVBM(IH-50,IV)
              ENCODE (2,1,ICH) I
              CALL CHARS(ICH, 1,1)
220       CONTINUE C  draw data zero lines
          IH = -XMIN*SX + MINHOR
          IV = -YMIN*SY + MINVER
          CALL MOVBM(IH,MINVER)
          CALL IVECT(IH,MAXVER,0)
          CALL MOVBM(MINHOR,IV)
          CALL IVECT(MAXHOR,IV,0)

C     Draw line of equal template and data values
          X = XMAX
          IF (X .GT. YMAX) X = YMAX
          IH = (X - XMIN)*SX + MINHOR
          IV = (X - YMIN)*SY + MINVER
          CALL MOVBM(IH,IV)
          X = XMIN
          IF (X .LT. YMIN)  X = YMIN
          IH = (X - XMIN)*SX + MINHOR
          IV = (X - YMIN)*SY + MINVER
          CALL IVECT(IH,IV,1)

RETURN
C------------------------------------------------------------
          END

C   SIGVER.FTN
          SUBROUTINE STATS(SS,ID,NPT,NCH,MAX)
C         Copyright 1975  Stanford Research Institute
C           December 2, 1974
C   Compute statistics (SS) for each channel over the data (ID)
C
C   ID(I,K) amplitude at time I for channel K
C   SS(J,K) statistic J for channel K--J=1=Ave, J=2=Sdv  J=3=Max, J=4=Min
C           J=5=Ave Abs, J=6=Ave Pos, J=7=Num Pos, J=8=Ave Neg
C           J=9=Num Neg, J=,  Number of Zero Crossings
C   NPT     number of points for each channel
C   NCH     number of channels
C------------------------------------------------------------
          DIMENSION SS(10,3),ID(MAX,3),ST(10)
          EQUIVALENCE (ST(1),SUM),(ST(2),SSQ),(ST(3),DMAX),(ST(4),DMIN)
     +      ,(ST(5),SABS),(ST(6),SPOS),(ST(7),NPOS),(ST(8),SNEG)
     +      ,(ST(9),NNEG),(ST(10),N0)
C------------------------------------------------------------
C
C     Compute statistics for each channel after normalizing the
C     data to mean zero, standard deviation 10.
C
          DO 50 K=1,NCH
C
C     Calculate mean and standard deviation
          AVE = SS(1,K)/NPT
          SDV = SQRT((SS(2,K) - NPT*AVE*AVE)/(NPT-1))
C
C     Initilize sums
C
          DO 10 J=1,10
            ST(J) = 0.0
10        CONTINUE
```

```
              A       = (ID(1,K) - AVE)*10.0 / SDV
              DMAX    = A
              DMIN    = A
              NO      = 0
              NPOS    = 0
              NNEG    = 0
C
C     Calculate sums
C
              DO 20 I =1,NPT
              D       = (ID(I,K) - AVE)*10.0/SDV
              SABS    = SABS + ABS(D)
              IF ( D  .GT. DMAX)  DMAX = D
              IF ( D  .LT. DMIN)  DMIN = D
              IF (A*D .LT. 0.0 )  NO   = NO   + 1
              IF ( D  .GT. 0.0 )  NPOS = NPOS + 1
              IF ( D  .GT. 0.0 )  SPOS = SPOS + D
              IF ( D  .LT. 0.0 )  NNEG = NNEG + 1
              IF ( D  .LT. 0.0 )  SNEG = SNEG + D
              A       = D
  20          CONTINUE
C
C     Calculate averages
C
              SS( 1,K) = AVE*10.0 / SDV
              SS( 2,K) = SDV
              SS( 3,K) = DMAX
              SS( 4,K) = DMIN
              SS( 5,K) = SABS/NPT
              SS( 7,K) = NPOS
              SS( 9,K) = NNEG
              SS(10,K) = NO
              IF (NPOS .GT. 0)  SS(6,K) = SPOS/NPOS
              IF (NNEG .GT. 0)  SS(8,K) = SNEG/NNEG
C
  50          CONTINUE
C-------------------------------------------------------------------
       RETURN
       END
C  SIGVER.FTN
       SUBROUTINE VSTATS(SS,NPT,NCH,LATER)
C      Copyright 1975  Stanford Research Institute
C            December 19, 1974
C   Compute statistics (SS) for each channel given the sums SS
C
C  SS(J,K) statistic J for channel K--J=1=Ave, J=2=Sdv, J=3=Max, J=4=Min
C          J=5=Ave Abs, J=6=Ave Pos, J=7=Num Pos, J=8=Ave Neg
C          J=9=Num Neg, J=10=Number of Zero Crossings
C  NPT     number of points for each channel
C  NCH     number of channels
C  LATER   flag to tell if statistics are to be accumulated on the fly
C          or after sampling is finished
C-------------------------------------------------------------------
       LOGICAL LATER
       DIMENSION SS(10,3)
C-------------------------------------------------------------------
C
C   Compute statistics for each channel
C
       DO 50 K=1,NCH SS(1,K) = SS(1,K)/NPT
              SS(2,K) = SQRT((SS(2,K)-NPT*SS(1,K)**2)/(NPT-1))
              SS(5,K) = SS(5,K)/NPT
              IF (SS(7,K) .GT. 0.0)  SS(6,K) = SS(6,K)/SS(7,K)
              IF (SS(9,K) .GT. 0.0)  SS(8,K) = SS(8,K)/SS(9,K)

50   CONTINUE
C-------------------------------------------------------------------
       RETURN
       END
```

What is claimed is:

1. A method of detecting whether a specimen signature is authentic or a forgery comprising
    writing a plurality of sample signatures,
    deriving from each sample a plurality of different sample parameter representative signals,
    deriving from the plurality of different sample parameter representative signals of all samples an average value signal for each parameter, each said average value signal representing the average value of corresponding sample parameter representative signals derived from all of said sample signatures,
    writing a specimen signature,
    deriving from said specimen signature a plurality of specimen parameter representative signals representing parameters corresponding to those derived from the sample signatures,
    combining each of said specimen parameter representative signals with an average value signal derived from corresponding sample signature parameters to provide a plurality of variance signals, and
    comparing said plurality of variance signals with reference means to determine whether said specimen signature is authentic or a forgery.

2. A method as recited in claim 1 wherein said step of combining each of said specimen parameter representative signals with an average value signal includes
    deriving from the plurality of different sample parameter representative signals of all samples a standard deviation signal for each different parameter,
    subtracting from each of the average value signals a specimen parameter representative signal representing a parameter corresponding to the average value signal parameter, to provide a difference signal for each parameter, and
    dividing the difference signal for each parameter by the standard deviation signal for the corresponding parameter to provide a variance signal for each parameter.

3. A method as recited in claim 2 wherein said step of comparing said plurality of variance signals with reference means comprises
    separately comparing each parameter with a separate reference to determine whether said specimen signature is authentic or a forgery.

4. A method as recited in claim 2 wherein said step of comparing said plurality of variance signals with said reference means
    to determine whether said specimen signature is authentic or a forgery includes
    combining all said variance signals from all parameters to produce a sum variance signal, and
    dividing said sum variance signal by the number of variance signals which were added to provide a resultant variance signal, which is compared with said reference.

5. A method as recited in claim 4 wherein said step of combining all said variance signals from all said parameters to produce a sum variance signal includes
    altering the values of some of said variance signals prior to combining in a predetermined manner to alter their weight in the sum variance signal.

6. A method as recited in claim 2 wherein said step of comparing said plurality of variance signals with said reference to determine whether said specimen signature is authentic or a forgery includes
    squaring each said variance signal to produce a squared variance signal for each parameter,
    combining all said squared variance signals to produce a sum of squared variance signals,
    taking the square root of said sum of squared variance signals to produce a square root variance signal, and
    dividing said square root variance signal by the square root of the number of squared variance signals which were added, to produce a resultant variance signal which is compared with said reference.

7. A method as recited in claim 6 wherein said step of combining all said squared variance signals to produce a sum of squared variance signals includes
    altering the value of some of said variance signals prior to combining in a predetermined manner to alter their weight in the sum of squared variance signals.

8. A method as recited in claim 2 wherein there is included the step of updating the average value signal for each parameter and the standard deivation signal for each parameter with the corresponding parameter representative signals derived from a valid specimen signature.

9. A method as recited in claim 1 wherein there is included the step of updating the average value signal for each parameter with the corresponding parameter representative signals derived from a valid specimen signature.

10. A method as recited in claim 9 wherein the step of updating the average value signal and the standard deviation signal for each parameter comprises
    deriving the updated average value signal and standard deviation signal for each parameter from the corresponding parameter representative signal of all but the first of the plurality of sample signatures which were written and from the parameter representative signals of said specimen signature.

11. A method of detecting whether a specimen signature is authentic or a forgery comprising
    writing a plurality of sample signatures,
    deriving from each sample a plurality of different sample parameter representative signals,
    deriving from the plurality of different sample parameter representative signals of all samples an average value signal for each parameter, each said average value signal representing the average value of corresponding sample parameter representative signals derived from all of said sample signatures,
    deriving from the plurality of different sample parameter representative signals of all samples a standard deviation signal for each different parameter,
    recording said average value signals and said standard deviation signals on a card,
    writing a specimen signature,
    deriving from said specimen signature a plurality of different specimen parameter representative signals,
    reading said average value signals and said standard deviation signals from said card,
    subtracting from each of the average value signals read from said card a specimen parameter representative signal derived from a corresponding parameter to provide a difference signal for each parameter,
    dividing the difference signal for each parameter by the standard deviation signal for a corresponding parameter to provide a plurality of variance signals, and
    comparing said plurality of variance signals with a reference to determine whether said specimen signature is valid.

12. A method of detecting whether a specimen signature is authentic or a forgery comprising
  writing a plurality of sample signatures,
  deriving from each sample signature, as it is being written, a plurality of different parameter representative signals,
  deriving from the parameter representative signals of all sample signatures an average value signal for each parameter, each said average value signal representing the average value of the corresponding parameter representative signals in all of said sample signatures,
  deriving from the corresponding parameter representative signals of all of said sample signatures a standard deviation signal for each different parameter,
  writing a specimen signature,
  deriving from said specimen signature as it is being written a plurality of parameter representative signals representing parameters corresponding to those derived from the sample signatures,
  subtracting from the average value signal for each parameter, the corresponding parameter representative signal derived from the specimen signature to produce a difference signal,
  for each parameter, dividing said difference signal by the standard deviation signal for the corresponding parameter to provide a quotient signal, and
  determining from the quotient signals from all parameters whether said specimen signature is valid or a forgery.

13. A method as recited in claim 12 wherein there is included the steps of
  updating the value of the average value signal and the standard deviation signal for each parameter with the corresponding parameter representative signal of a specimen signature which is valid.

14. A method as recited in claim 13 wherein the step of updating the value of the average value signal and standard deviation signal for each parameter with the corresponding parameter representative signal of a valid specimen comprises
  deriving said updated average value signal and standard deviation signal for each parameter from the corresponding parameter representative signals of all but the first of the plurality of sample signatures which were written and from the parameter representative signals of said specimen signature.

15. A method as recited in claim 14 wherein the step of determining from the quotient signals from all parameters whether said specimen signature is valid or a forgery includes
  adding the absolute value of the quotient signals of all of said parameters to provide a sum signal,
  dividing said sum signal by the number of parameter signals which have been added to produce an average sum signal,
  establishing a predetermined value threshold signal, and
  comparing said average sum signal with said threshold value to produce an indication that said signature is valid when said average sum signal is less than said threshold signal and that said signature is a forgery when said average sum signal is more than said threshold signal.

16. A method as recited in claim 12 wherein the step of determining from the quotient signals whether said specimen signature is valid or a forgery comprises
  squaring the quotient signal for each parameter
  establishing a predetermined value for a threshold signal for each parameter, and
  for each parameter comparing each said threshold signal with each said squared quotient signal and producing a parameter valid signal if the threshold equals or is less than said squared quotient signal and a parameter invalid signal if the threshold is less than said squared quotient signal, whereby the validity of the specimen signature can be determined from the signals produced as a result of said comparison.

17. A method as recited in claim 12 wherein the step of determining from the quotient signals whether said specimen signature is valid or a forgery comprises
  squaring the quotient signals for each parameter to produce squared quotient signals,
  adding all said squared quotient signals of all parameters to produce a parameter sum signal,
  taking the square root of the parameter sum signal,
  dividing the square root of the parameter sum signal by a number equal to the square root of the number of parameters which have been added to provide an RMS signal,
  establishing a predetermined value for a threshold signal,
  comparing said threshold signal with said RMS signal, and
  producing a signature valid signal if the threshold equals or is less than said threshold signal and a signature invalid signal if the threshold is less than said RMS signal.

18. A method as recited in claim 12 wherein said method of deriving from each sample signature, as it is being written, a plurality of different parameter representative signals comprising
  deriving from each sample signature a plurality of different force signals,
  deriving from said plurality of different force signals a plurality of different parameter representative signals.

19. A method as recited in claim 12 wherein said step of deriving from said parameter representative signals an average value signal for each parameter comprising
  for each parameter, adding all of the corresponding parameter signals, from all of the sample signals, and
  dividing the added parameter signals by the number of sample signatures which have been used.

20. A method as recited in claim 12 wherein said method of deriving a standard deviation signal comprises, for each parameter,
  squaring the corresponding parameter representative signals derived from all sample signatures,
  adding all of said squared parameter representative signals to provide a sum of squared signal,
  squaring the average value signal,
  multiplying the squared average value signal by the number of sample signatures to produce a product signal,
  subtracting said product signal from said sum of squares signal to obtain a difference signal,
  dividing said difference signal by a number which is one less than the number of sample signatures to provide a quotient signal which is the square of the standard deviation signal, and
  taking the square root of said square of the standard deviation signal to obtain the standard deviation signal.

21. In a system of the type wherein a pen means for generating a plurality of different parameter signals is used for writing several sample signatures and thereafter for writing a specimen signature and it is desired to determine whether said specimen signature is authentic or a forgery comprising means for deriving from the plurality of different sample parameter representative signals of all samples an average value signal for each parameter, each said average value signal representing the average value of corresponding sample parameter representative signals derived from all of said sample signatures, means for deriving from said specimen signature a plurality of specimen parameter representative signals representing parameters corresponding to those derived from the sample signatures, means for combining each of said specimen parameter representative signals with an average value signal derived from corresponding sample signature parameters to provide a plurality of variance signals, a reference means, and means for comparing said plurality of variance signals with said reference means to determine whether said specimen signature is authentic or a forgery.

22. Apparatus as recited in claim 21 wherein said means for combining each of said specimen parameter representative signals with an average value signal includes means for deriving from the plurality of different sample parameter representative signals of all samples a standard deviation signal for each different parameter, means for subtracting from each of the average value signals a specimen parameter representative signal representing a parameter corresponding to the average value signal parameter, to provide a difference signal for each parameter, and means for dividing the difference signal for each parameter by the standard deviation signal for the corresponding parameter to provide a variance signal for each parameter.

23. Apparatus as recited in claim 22 wherein said means for comparing said plurality of variance signals with reference means comprises a separate reference means associated with each of said plurality of variance signals, means for separately comparing each variance signal with its associate reference means to determine whether said specimen signature is authentic or a forgery.

24. Apparatus as recited in claim 22 wherein said means for comparing said plurality of variance signals with said reference to determine whether said specimen signature is authentic or a foregery includes means for combining all said variance signals from all parameters to produce a sum variance signal, and means for dividing said sum variance signal by the number of variance signals which were added to provide a resultant variance signal, which is compared with said reference.

25. Apparatus as recited in claim 24 wherein said means for combining all said variance signals from all said parameters to produce a sum variance signal includes means for altering the values of some of said variance signals prior to combining in a predetermined manner to alter their weight in the sum variance signal.

26. Apparatus as recited in claim 22 wherein said means for comparing said plurality of variance signals with said reference to determine whether said specimen signature is authentic or a forgery includes means for squaring each said variance signal to produce a squared variance signal for each parameter, means for combining all said squared variance signals to produce a sum of squared variance signals, means for taking the square root of said sum of squared variance signals to produce a squared root variance signal, means for dividing said square root variance signal by the number of squared variance signals which were added, to produce a resultant variance signal which is compared with said reference.

27. Apparatus as recited in claim 26 wherein said means for combining all said squared variance signals to produce a sum of squared variance signals includes means for altering the value of some of said variance signals prior to combining in a predetermined manner to alter their weight in the sum of squared variance signals.

28. Apparatus as recited in claim 22 wherein there is included means for updating the average value signal for each parameter and the standard deviation signal for each parameter from the corresponding parameter representative signals derived from a valid specimen signature.

29. Apparatus as recited in claim 28 wherein said means for updating the average value signal and the standard deviation signal for each parameter comprises means for deriving the updated average value signal and standard deviation signal for each parameter of all but the first of the plurality of sample signatures which were written and from the parameter representative signals of said specimen signature.

30. Apparatus as recited in claim 21 wherein there is included means for updating the average value signal for each parameter from the corresponding parameter representative signals derived from a valid specimen signature.

31. In a system of the type wherein a pen means for generating a plurality of different parameter signals is used for writing several sample signatures and thereafter for writing a specimen signature, and there has been derived from the plurality of different sample parameter representative signals of all samples, an average value signal for each parameter, each said average value signal representing the average value of corresponding sample parameter representative signals derived from all of said sample signatures, and there has also been derived from the plurality of different sample parameter representative signals of all samples a standard deviation signal for each different parameter, and it is desired to determine whether said specimen signature is authentic or a forgery, said system comprising a card having
    said average value signals and said standard deviation signals recorded thereon, means for reading said average value signals and said standard deviation signals from said card, means for subtracting from each of the average value signals read from said card a specimen parameter representative signal derived from a corresponding parameter to provide a difference signal for each parameter, means for dividing the difference signal for each parameter by the standard deviation signal for a corresponding parameter to provide a plurality of variance signals, a reference means, and means for comparing said plurality of variance signals with a reference means to determine whether said specimen signature is valid.

32. In a system of the type wherein a pen means for generating a plurality of different parameter signals is used for writing several sample signatures and thereafter for writing a specimen signature and it is desired to determine whether said specimen signature is valid or a forgery, the improvement comprising means for deriving, for each parameter, a sample signature average value signal from the plurality of parameter signals generated in writing said sample signatures, each sample signature value signal being the average value of the parameter signals for one parameter of all sample signatures, means for deriving, for each parameter, from said sample signature a standard deviation signal, means for deriving from a plurality of parameter signals generated in writing said specimen signature, a parameter average value signal for each different parameter, means, for each different parameter, for subtracting said parameter average value signal from said specimen signal average value signal to provide a difference signal, means, for each different parameter, for dividing said difference signal by said standard deviation signal to provide a quotient signal, means, for each different parameter, for squaring said quotient signal, and means for determining from the squared quotient signals for all said parameters whether the specimen signature is valid or invalid and producing signals indicative thereof.

33. In a system as recited in claim 32 wherein said means for deriving a sample signature average value signal for each parameter includes means for updating the sample signature average value signal with valid signal data comprising means responsive to a signal indicative of a valid specimen signature for substituting the parameter average value signals from said valid specimen signature in place of the parameter signals generated when said pen means writes the first of said specimen signatures, and means responsive to said signal indicative of a valid specimen signature for enabling said means for deriving sample signature average value signals to derive sample signature average value signals for each parameter from said substitute parameter average value signals and from the remaining parameter signals from said remaining sample signatures.

34. In a system as recited in claim 32 wherein said means for deriving a sample signature average value signal for each different parameter comprises means for each parameter for adding all the parameter signals generated for the same parameter in all of said signatures to produce a different sum signal for each parameter, and means for dividing each said sum signal by the number of sample signatures to provide a sample signature average value signal for each parameter.

35. In a system as recited in claim 32 wherein said means for deriving a standard deviation signal for each different parameter comprises, for each parameter means for squaring each parameter signal generated in writing a sample signature, for each parameter, means for adding all the squared parameter signals to provide a sum of squared signals for each different parameter, means for squaring the sample signature average value signal for each parameter to produce a square average value signal for each parameter, means for multiplying the squared average value signal for each parameter by the number of sample signatures to produce a product signal, means for subtracting, for each parameter, the product signal from the sum of squared signal to produce a difference signal for each parameter, means, for each parameter, for dividing said difference signal by the number of sample signatures less one to provide a square of the standard deviation signal, and means for each parameter for taking the square root of said square of the standard deviation signal to provide said standard deviation signal.

36. In a system as recited in claim 32 wherein said means for determining from the quotient signals whether a specimen signature is valid or invalid comprises, for each parameter, means for squaring each quotient signal to provide squared quotient signals, means for establishing a predetermined value threshold signal, and means for each parameter for comparing said threshold signal with said squared quotient signal and producing a parameter valid signal if said squared quotient signal is less than said threshold signal, and a parameter invalid signal if said squared quotient signal is more than said threshold signal whereby the number of parameter valid signals indicate the validity of said specimen signature.

37. In a system as recited in claim 32 wherein said means for determining from the quotient signals derived for all parameters, whether said specimen signature is valid or invalid comprises means for adding all of the absolute values of the quotient signals to produce a sum quotient signal, means for dividing said sum quotient signal by the number of quotient signals which were added to produce an average quotient signal, means for establishing a threshold signal having a predetermined value, means for comparing said threshold signal with said average quotient signal and producing a valid signal when said threshold signal is the greater and an invalid signal when said threshold signal is the lesser.

38. In a system as recited in claim 32 wherein the means for determining from the quotient signals whether said specimen signature is valid or a forgery comprises, means for squaring each of said quotient signals to provide squared quotient signals, means for adding all of said squared quotient signals to produce a sum of squares signal, means for taking the square root of said sum of squares signal to provide a square root signal, means for dividing said square root signal by the number of quotient signals which were added to provide a resultant signal, means for establishing a threshold signal having a predetermined value, means for comparing said threshold signal with said resultant signal and providing a valid indication when said threshold signal exceeds said resultant signal and an invalid indication when said resultant signal exceeds said threshold signal.

39. A method of detecting whether a specimen signature is authentic or a forgery comprising writing a plurality of sample signatures, deriving from each sample a plurality of different sample parameter representative signals, deriving from the plurality of different sample parameter representative signals of all samples an average value signal for each parameter, each said average value signal representing the average value of corresponding sample parameter representative signals derived from all of said sample signatures, writing a specimen signature, deriving from said specimen signature a plurality of specimen parameter representative signals representing parameters corresponding to those derived from the sample signatures, combining each of said specimen parameter representative signals with an average value signal derived from corresponding sample signature parameters to provide a plurality of variance signals, deriving from the plurality of different sample parameter representative signals of all samples a standard deviation signal for each different parameter, subtracting from each of the average value signals a specimen parameter representative signal representing a parameter corresponding to the average value signal parameter to provide a difference signal for each parameter, dividing the difference signal for each parameter by the standard deviation signal for the corresponding parameter to provide a variance signal for each parameter squaring each variance signal to produce a squared variance signal for each parameter, and comparing said squared reference signal with reference means to determine whether said signature is valid or a forgery.

40. A method of detecting whether a specimen signature is authentic or a forgery comprising writing a plurality of sample signatures, deriving from each sample a plurality of different sample parameter representative signals, deriving from the plurality of different sample parameter representative signals of all samples an average value signal for each parameter, each said average value signal representing the average value of corresponding sample parameter representative signals derived from all of said sample signatures, recording said average value signals on a card, writing a specimen signature, deriving from said specimen signature a plurality of different specimen parameter representative signals, reading said average value signals from said card, combining each of the average value signals read from said card with a specimen parameter representative signal derived from a corresponding parameter to provide a variance signal for each parameter, and comparing said variance signal for each parameter with reference means to determine whether said specimen signature is authentic or a forgery.

41. In a system of the type wherein a pen means for generating a plurality of different parameter signals is used for writing several sample signatures and thereafter for writing a specimen signature and it is desired to determine whether said specimen signature is authentic or a forgery comprising means for deriving from the plurality of different sample parameter representative signals of all samples an average value signal for each parameter, each said average value signal representing the average value of corresponding sample parameter representative signals derived from all of said sample signatures, means for deriving from said specimen signature a plurality of specimen parameter representative signals representing parameters corresponding to those derived from the sample signatures, means for combining each of said specimen parameter representative signals with an average value signal derived from corresponding sample signature parameters to provide a plurality of variance signals, means for deriving from the plurality of different sample parameter representative signals of all samples a standard deviation signal for each different parameter, means for subtracting from each of the average value signals a specimen parameter representative signal representing a parameter corresponding to the average value signal parameter, to provide a difference signal for each parameter, means for dividing the difference signal for each parameter by the standard deviation signal for the corresponding parameter to provide a variance signal for each parameter, means for squaring each variance signal to produce a squared reference signal for each parameter, reference means, and means for comparing said squared reference signals with said reference means to determine whether said specimen signature is authentic or a forgery.

42. In a system of the type wherein a pen means for generating a plurality of different parameter signals is used for writing several sample signatures and thereafter for writing a specimen signature, and there has been derived from the plurality of different sample parameter representative signals of all samples an average value signal for each parameter, each said average value signal representing the average value of corresponding sample parameter representative signals derived from all of said sample signatures, and there is included a card having provision for recording thereon said average value signals, and it is desired to determine whether said specimen signature is authentic or a forgery, said system comprising means for deriving from said specimen signature a plurality of specimen parameter representative signals representing parameters corresponding to those derived from the sample signatures, means for reading said average value signals from said card, means for combining each of said specimen parameter representative signals with an average value signal read from said card which was derived from corresponding sample signature parameters to provide a plurality of variance signals, a reference means, and means for comparing said plurality of variance signals with said reference means to determine whether said specimen signature is authentic or a forgery.

* * * * *